United States Patent
Malla

(10) Patent No.: US 9,836,385 B2
(45) Date of Patent: Dec. 5, 2017

(54) CROSS-BROWSER WEB APPLICATION TESTING TOOL

(71) Applicant: SYNTEL, INC., Troy, MI (US)

(72) Inventor: Prasanth Kiran Malla, Tamil Nadu (IN)

(73) Assignee: Syntel, Inc., Troy, MI (US)

(*) Notice: Subject to any disclaimer, the term of this patent is extended or adjusted under 35 U.S.C. 154(b) by 123 days.

(21) Appl. No.: 14/551,265

(22) Filed: Nov. 24, 2014

(65) Prior Publication Data

US 2016/0147641 A1  May 26, 2016

(51) Int. Cl.
G06F 9/44  (2006.01)
G06F 11/36 (2006.01)

(52) U.S. Cl.
CPC ...... *G06F 11/3664* (2013.01); *G06F 11/3692* (2013.01)

(58) Field of Classification Search
CPC .... G06F 3/0482; G06F 3/0484; G06F 3/0481; G06F 3/04847; G06F 17/30572; G06F 17/30991; G06F 11/3409; G06F 11/3664; G06F 11/3692; G06F 3/04845
See application file for complete search history.

(56) References Cited

U.S. PATENT DOCUMENTS

| | | | |
|---|---|---|---|
| 5,936,622 A * | 8/1999 | Halverson | G06F 3/04847 345/440.1 |
| 6,789,252 B1 * | 9/2004 | Burke | G06F 8/10 717/100 |
| 6,854,089 B1 * | 2/2005 | Santee | G06F 11/3688 714/E11.208 |
| 6,918,066 B2 | 7/2005 | Dutta et al. | |
| 7,757,175 B2 | 7/2010 | Miller | |
| 7,877,645 B2 * | 1/2011 | Meyer | G06F 11/008 714/47.3 |
| 8,170,859 B1 * | 5/2012 | Christensson | G06F 9/4812 703/22 |
| 8,490,059 B2 | 7/2013 | Huang et al. | |

(Continued)

OTHER PUBLICATIONS

Giuseppe A. Di Lucca et al.; Considering Browser Interaction in Web Application Testing; 2003 IEEE; 8 pages; <http://ieeexplore.ieee.org/stamp/stamp.jsp?arnumber=1234011>.*

(Continued)

*Primary Examiner* — Thuy Dao
*Assistant Examiner* — Cuong V Luu
(74) *Attorney, Agent, or Firm* — Dykema Gossett PLLC

(57) ABSTRACT

A system for cross-browser testing of one or more web applications may include receiving user selection of web browsers, one or more test fields each corresponding to a specified web element, one or more attributes each corresponding to a specified property of a web element, and a tolerance value for each of the one or more selected attributes. A system for cross-browser testing may be configured to compare a selected attribute of each selected test field within a web page rendered by one selected browser with a corresponding attribute of a corresponding test field within the web page rendered by another selected browser relative to a selected tolerance value, and generate a report of the comparison. A system for cross-browser testing may be configured for comparisons independent of a human language used and may include a language translation module.

20 Claims, 19 Drawing Sheets

(56) References Cited

U.S. PATENT DOCUMENTS

| | | | |
|---|---|---|---|
| 8,504,991 B2 | 8/2013 | Huang et al. | |
| 8,938,683 B2* | 1/2015 | Bentrup | G06F 11/3664 715/760 |
| 9,235,490 B2* | 1/2016 | Dahan | G06F 11/3636 717/127 |
| 2005/0177597 A1 | 8/2005 | Elmer | |
| 2008/0229231 A1 | 9/2008 | Delia et al. | |
| 2009/0037777 A1* | 2/2009 | Meyer | G06F 11/008 714/47.1 |
| 2010/0211893 A1 | 8/2010 | Fanning et al. | |
| 2011/0078663 A1* | 3/2011 | Huang | G06F 17/30876 717/126 |
| 2011/0093773 A1 | 4/2011 | Yee | |
| 2011/0173589 A1* | 7/2011 | Guttman | G06F 17/30873 717/125 |
| 2011/0214107 A1* | 9/2011 | Barmeir | G06F 11/3684 717/125 |
| 2011/0289489 A1* | 11/2011 | Kumar | G06F 11/3664 717/135 |
| 2012/0176416 A1* | 7/2012 | Dondurur | G06F 3/04845 345/666 |
| 2012/0260327 A1 | 10/2012 | Lissick | |
| 2012/0311539 A1* | 12/2012 | Bullard | G06F 11/368 717/127 |
| 2014/0075344 A1* | 3/2014 | Bentrup | G06F 11/3664 715/760 |
| 2015/0286470 A1* | 10/2015 | Dahan | G06F 11/3636 717/127 |

OTHER PUBLICATIONS

Jim Conallen; Modeling Web application architectures with UML; 1999 ACM; pp. 63-70; <http://dl.acm.org/citation.cfm?id=317677>.*

David C. Kung et al.; An Object-Oriented Web Test Model for Testing Web Applications; 2000 IEEE; pp. 111-120; <http://ieeexplore.ieee.org/stamp/stamp.jsp?arnumber=883784>.*

Sebastian Elbaum et al.; Proving Web Application Testing with User Session Data; 2003 IEEE; pp. 49-59; <http://dl.acm.org/citation.cfm?id=776823>.*

Edward Hieatt et al.; Going Faster Testing the Web Application; 2002 IEEE: pp. 60-65; <http://ieeexplore.ieee.org/stamp/stamp.jsp?arnumber=991333>.*

Sebastian Elbaum et al.; Leveraging User Session Data to Support Web Application Testing; 2005 IEEE; pp. 187-202; <http://ieeexplore.ieee.org/stamp/stamp.jsp?arnumber=1423991>.*

Chisholm, Wendy et al. "List of Checkpoints for Web Content Accessibility Guidelines 1.0" (1999, 6 pgs.).

Lounibos, Tom "SOASTA Adds Selenium-based Functional Testing to its CloudTest Platform", SOASTA Blog (Oct. 4, 2011, 5 pgs.).

Perfecto Mobile, "The Continuous Quality Lab", (2015, 12 pgs.).

Browser Shots, BrowserShots.org, (2005-2011, 2 pgs.).

CrossBrowserTesting, Cross Brower Test Your Website in Dozens of Browsers with Instant Results, (2012, 2 pgs.).

Deering, Sam, JavaScript, "5 Free Online Browser Testing Tools", (Oct. 14, 2013, 4 pgs).

Deering, Sam, JavaScript, "5 Paid Online Browser Testing Tools", (Oct. 14, 2013, 4 pgs.).

Chapman, Cameron, Smashing Magazine, "Review of Cross-Browser Testing Tools", (Aug. 7, 2011, 14 pgs.).

Charypar, Viktor, Red Badger "Automated Cross-Browser Testing with BrowserStack and Circle CI" (May 27, 2014, 8 pgs.).

BrowserStack, Review: "If you work on the web, you need BrowserStack" (May 5, 2014, 2 pgs.).

Hanselman, Scott, "Distributed Automated Browser Testing with Selenium and BrowserStack" (Feb. 20, 2014, 7 pgs.).

Hanselman, Scott, "Cross Browser Debugging Integrated into Visual Studio with BrowserStack" (Jan. 31, 2013, 6 pgs.).

Smith, Grace, Mashable, "13 Essential Tools to Check Cross-Browser Compatibility", (Feb. 26, 2014, 18 pgs.).

Garsiel, Tali et al. "How Browsers Work: Behind the Scenes of Modern Web Browsers", (Aug. 5, 2011, 57 pgs.).

* cited by examiner

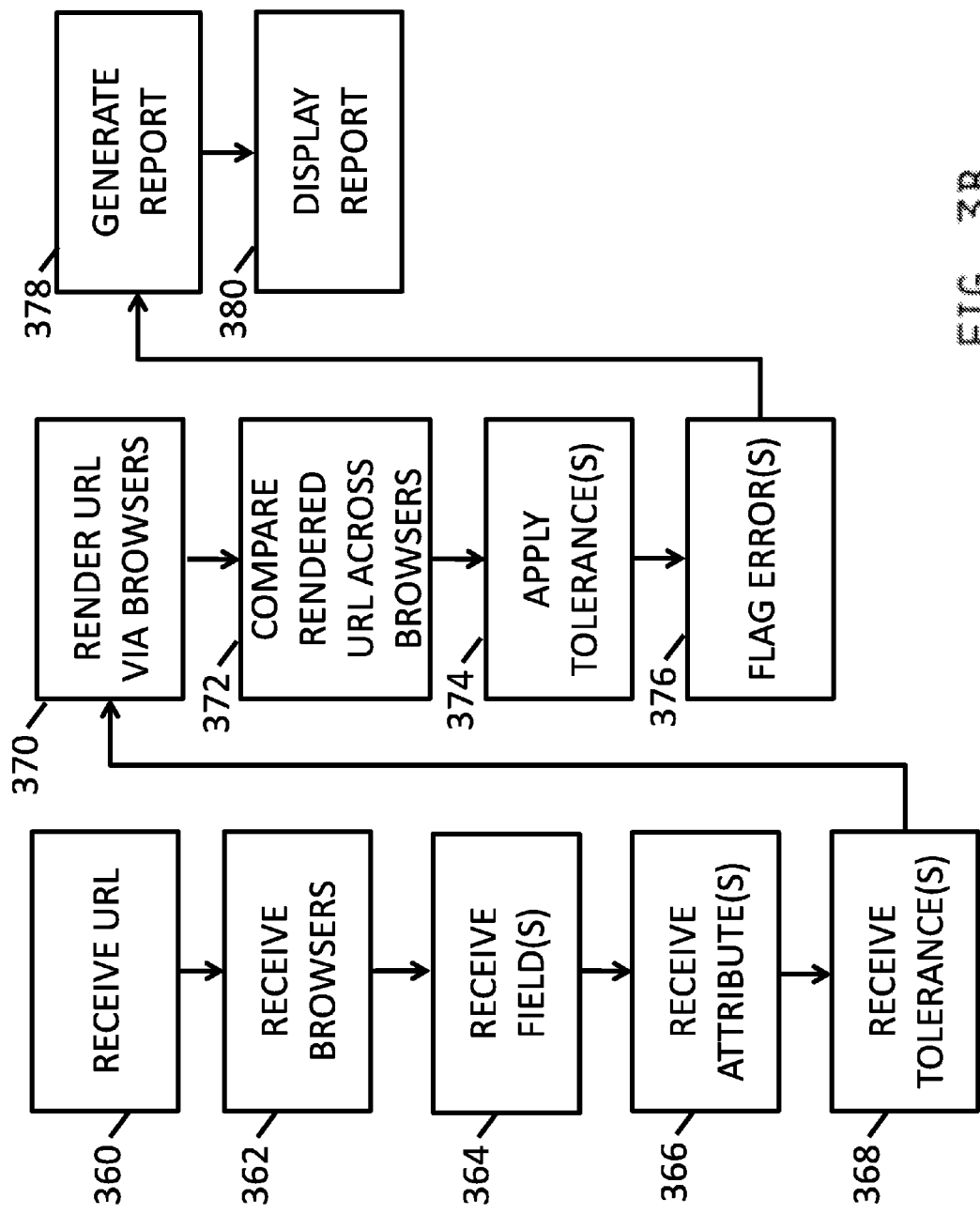

FIG. 8

CROSS-BROWSER WEB APPLICATION TESTING TOOL

TECHNICAL FIELD

The present invention relates generally to systems and methods for testing and validating web pages and web applications.

BACKGROUND

Cross-browser web application testing is generally understood to refer to a process by which a web page rendered by one web browser is compared and evaluated against the web page rendered by a different web browser. Such cross-browser web application testing is useful for identifying web application rendering differences between different web browsers.

SUMMARY

The present invention may comprise one or more of the features recited in the attached claims, and/or one or more of the following features and combinations thereof. In a first example aspect, a cross-browser web application testing system may comprise a memory unit having two or more different web browsers stored therein, one or more computers coupled to the memory unit and connectable to a public or private network, a graphical user interface (GUI) module on at least one of the one or more computers to receive user selection of at least two of the two or more web browsers, user selection of one or more test fields each corresponding to a specified web element within a web page, user selection of a plurality of attributes each corresponding to a specified property of a web element within a web page, and user selection of a tolerance value for each of the one or more selected attributes, each tolerance value corresponding to an allowed rendering error of a corresponding one of the one or more attributes, a web application test module on the at least one of the one or more computers to access a web page via the public or private network and to compare each selected attribute of each selected test field within the web page rendered by one of the at least two selected browsers with a corresponding attribute of a corresponding test field within the web page rendered by the another of the at least two selected browsers as a function of the selected tolerance value associated with each selected attribute, and a report module on the at least one of the one or more computers to generate a report of the comparisons.

In embodiments, the web application test module may generate an error flag for each selected attribute of each selected test field of the web page rendered by the one of the at least two selected browsers that differs from a corresponding attribute of a corresponding test field within the web page rendered by the another of the at least two selected browsers by at least the tolerance value associated with the selected attribute. The report module may further generate a report identifying the error flags along with the attributes and the test fields associated therewith.

In embodiments, the web application test module may generate a warning flag for each selected attribute of each selected test field of the web page rendered by the one of the at least two selected browsers that differs from a corresponding attribute of a corresponding test field within the web page rendered by the another of the at least two selected browsers by less than the tolerance value associated with the selected attribute, but that is greater than zero. In embodiments, the web application test module may generate a pass flag for each selected attribute of each selected test field of the web page rendered by the one of the at least two selected browsers that does not differ from a corresponding attribute of a corresponding test field within the web page rendered by the another of the at least two selected browsers. The report module may further generate a report identifying the error flags along with the attributes and the test fields associated therewith and further identifying the pass flags along with the attributes and the test fields associated therewith. Alternatively or additionally, the report module may further generate a report identifying a total number of pass flags, warning flags, and error flags over all comparisons made by the web application test module. Alternatively or additionally still, the report module may further generate a report identifying a total pass flag percentage for at least one of the selected test fields. Alternatively or additionally still, the report module may further generate a report identifying a total pass flag percentage for at least one of the selected attributes across all of the selected test fields.

In embodiments, the user interface module may produce a graphic user interface including a first menu of the two or more web browsers for user selection therefrom, a second menu of the one or more test fields for user selection therefrom, a third menu of the one or more attributes for user selection therefrom and one or more tolerance value fields for user selection of the tolerance value for each of the one or more selected attributes. The system may further comprise a data management module to receive user selection of items contained in at least one of the first, second and third menus.

In embodiments, the web application test module may compare run time values of each selected attribute of each selected test field within the web page rendered by one of the at least two selected browsers with a run time value of a corresponding attribute of a corresponding test field within the web page rendered by the another of the at least two selected browsers as a function of the selected tolerance value associated with each selected attribute.

In embodiments, a cross-browser web application testing system may comprise a public or private network, one or more processors, and a memory having stored therein two or more different web browsers, the memory further having instructions stored therein which, when executed by at least one of the one or more processors, cause the at least one of the one or more processors to receive user input of a universal resource locator (URL), to receive user selection of two of the two or more web browsers, to receive user selection of one or more test fields each corresponding to a specified web element within a web page, to receive user selection of one or more attributes each corresponding to a specified property of a web element within a web page, to receive user selection of a tolerance value for each of the one or more selected attributes, each tolerance value corresponding to an allowed rendering error of a corresponding one of the one or more attributes, to access a web page specified by the URL via the public or private network, to compare each selected attribute of each selected test field within the web page rendered by one of the two selected browsers with a corresponding attribute of a corresponding test field within the web page rendered by the other of the two selected browsers as a function of the selected tolerance value associated with each selected attribute, and to generate a report of the comparisons.

In embodiments, the instructions stored in the memory further include instructions which, when executed by at least one of the one or more processors, cause the at least one of the one or more processors to receive user selection of either of the two selected web browsers as a base web browser, and to be responsive to user selection of the standard web browser to generate the report of the comparisons of each selected attribute of each selected test field within the web page rendered by the non-selected one of the two selected browsers against a corresponding attribute of a corresponding test field within the web page rendered by the base web browser as a function of the selected tolerance value associated with each selected attribute.

In embodiments, the instructions stored in the memory further include instructions which, when executed by at least one of the one or more processors, cause the at least one of the one or more processors to generate an error flag for each selected attribute of each selected test field of the web page rendered by the one of the two selected browsers that differs from a corresponding attribute of a corresponding test field within the web page rendered by the other of the two selected browsers by at least the tolerance value associated with the selected attribute, and to generate a difference image of the web page rendered by the two selected web browsers, the difference image including a rendering of the web page with each of the selected test fields highlighted in which at least one error flag is present. Alternatively or additionally, the instructions stored in the memory further include instructions which, when executed by at least one of the one or more processors, cause the at least one of the one or more processors to generate a warning flag for each selected attribute of each selected test field of the web page rendered by the one of the two selected browsers that differs from a corresponding attribute of a corresponding test field within the web page rendered by the other of the two selected browsers by less than the tolerance value associated with the selected attribute, and to generate a difference image of the web page rendered by the two selected web browsers, the difference image including a rendering of the web page with each of the selected test fields highlighted in which warning flags are present. Additionally or alternatively, instruction stored in the memory may include instructions which, when executed by at least one of the one or more processors, cause the at least one of the one or more processors to generate a pass flag for each selected attribute of each selected test field of the web page rendered by a selected browser that equals a corresponding attribute of a corresponding test field rendered by a different selected browser. The instructions may, when executed by at least one processor, cause the generation of a difference image of the web page rendered by the selected browsers and selected test fields may be highlighted for each pass flag.

In embodiments, a computer-implemented method for cross-browser testing of one or more web applications may comprise receiving, with at least one of the one or more computers, user selection of two of the two or more web browsers, receiving, with at least one of the one or more computers, user selection of one or more test fields each corresponding to a specified web element within a web page, receiving, with at least one of the one or more computers, user selection of one or more attributes each corresponding to a specified property of a web element within a web page, receiving, with at least one of the one or more computers, user selection of a tolerance value for each of the one or more selected attributes, each tolerance value corresponding to an allowed rendering error of a corresponding one of the one or more attributes, accessing, with at least one of the one or more computers, a specified web page, comparing, with at least one of the one or more computers, each selected attribute of each selected test field within the web page rendered by one of the two selected browsers with a corresponding attribute of a corresponding test field within the web page rendered by the other of the two selected browsers as a function of the selected tolerance value associated with each selected attribute, and with at least one of the one or more computers, generating a report of the comparisons.

In embodiments, the computer-implemented method may further comprise generating, with at least one of the one or more computers, at least one of an error flag for each selected attribute of each selected test field of the web page rendered by the one of the two selected browsers that differs from a corresponding attribute of a corresponding test field within the web page rendered by the other of the two selected browsers by at least the tolerance value associated with the selected attribute and a warning flag for each selected attribute of each selected test field of the web page rendered by the one of the two selected browsers that differs from a corresponding attribute of a corresponding test field within the web page rendered by the other of the two selected browsers by less than the tolerance value associated with the selected attribute. The method may comprise generating a pass flag for each selected attribute of each selected test field of the web page rendered by a selected browser that equals a corresponding attribute of a corresponding test fielding within the web page rendered by a different selected browser. The computer-implemented method may further comprise generating, with at least one of the one or more computers, a report identifying at least one of one or more of the error flags along with the attributes and the test fields associated therewith and one or more of the pass flags along with the attributes and the test fields associated therewith.

In embodiments, accessing the web page comprises the selected browsers receiving information from a web server, and the selected browsers transforming the information received from the webserver to render the web page to the user, wherein the each of the selected browsers transforms the information received from the webserver differently In embodiments, the act of comparing may comprise comparing run time values of each selected attribute of each selected test field within the web page rendered by the one of the two selected browsers with a run time value of a corresponding attribute of a corresponding test field within the web page rendered by the other of the two selected browsers as a function of the selected tolerance value associated with each selected attribute.

In embodiments, at least one of the one or more selected test fields may be a text field, and comparison of the text field rendered by the one of the two selected browsers with the text field rendered by the other of the two selected browsers may be independent of a human language in which the text field is rendered by the two selected browsers.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

FIG. 3B is a simplified flow chart generally illustrating an example flow of an embodiment of a cross-browser web application testing tool.

FIG. 8 is an example screen shot illustrating an example testing execution entries GUI generated by embodiments of the cross-browser web application testing tool.

DETAILED DESCRIPTION OF THE DRAWINGS

Figure 1:
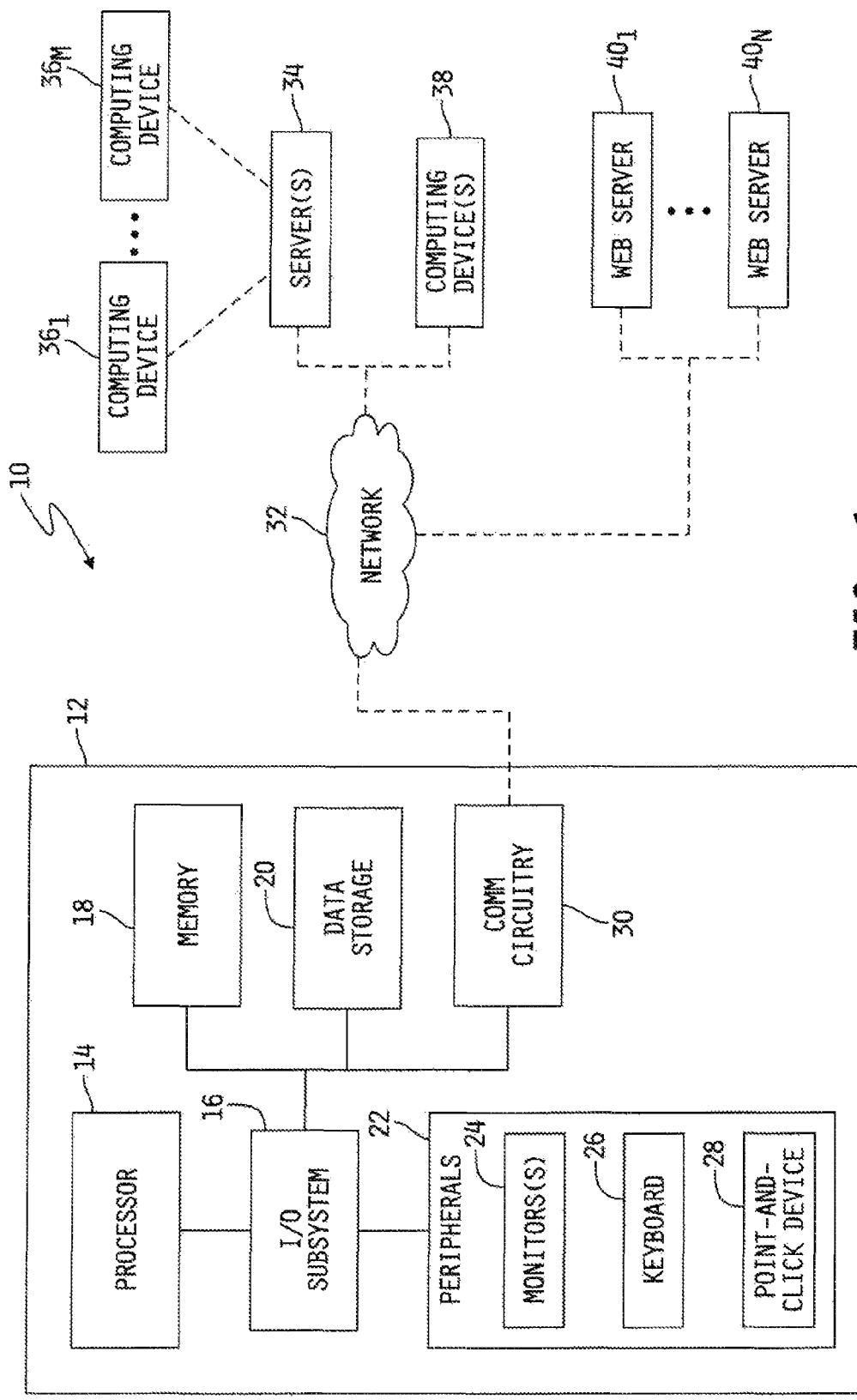
FIG. 1 is a simplified block diagram representation of an embodiment of a cross-browser web application testing system.

While aspects of the present disclosure are susceptible to various modifications and alternative forms, specific exemplary embodiments thereof have been shown by way of example in the drawings and will herein be described in detail. It should be understood, however, that there is no intent to limit the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of a person having ordinary skill in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred.

Embodiments of the present disclosure may be implemented in hardware, firmware, software, or any combination thereof. Embodiments of the present disclosure implemented in a computer system may include one or more bus-based interconnects between components and/or one or more point-to-point interconnects between components. Embodiments of the present disclosure may also be implemented as instructions stored on one or more non-transitory computer/machine-readable media, which may be read and executed by one or more processors. A machine-readable medium may be embodied as any device or physical structure for storing or transmitting information in a form readable by a machine (e.g., a computing device). For example, a machine-readable medium may be embodied as any one or combination of read only memory (ROM); random access memory (RAM); magnetic disk storage media; optical storage media; flash memory devices; and others.

Referring now to FIG. 1, an embodiment is shown of a cross-browser web application testing system 10. In embodiments, the system 10 may include a computing device 12 which may be coupled or connectable via a network 32 to one or more remote servers 34 and/or to one or more remote computing devices $36_1$-$36_M$. In some embodiments, any of the one or more servers 34 may be coupled to or connectable to any number of remote computing devices $36_1$-$36_M$, where M may represent a total number of remote computing devices and be any positive integer. With respect to the one or more servers 34 and/or one or more computing devices 38, the network 32 may be a publicly accessible network or a private network, and/or may include public portions and private/local portions.

The computing device 12 may further be connectable via the network 32 to one or more web servers $40_1$-$40_N$, where N may represent a total number of web servers and may be any positive integer. The one or more web servers $40_1$-$40_N$ may be configured to operate using the HTTP protocol. With respect to the one or more web servers $40_1$-$40_N$, the network 32 may include a type that is publicly accessible and/or that is private. The type (e.g., public or private) of network 32 or the type of the portion of network 32 to which the one or more web servers are connectable may be independent of the type of network 32 or the type of the portion of network 32 that is connected or connectable between the computing device 12 and the one or more servers 34 and/or one or more computing devices 38.

A particular web application may be rendered differently by different browsers, and the system 10 may be configured to analyze the differences between the renderings (e.g., functional and/or non-functional differences). For example, in rendering a web page or web application, a browser may transform data from a source file (e.g., an html file) corresponding to the web page or application into a document object model (DOM). The transformation conducted by a particular browser may not be same as a transformation by another version of that browser for that web page or the same as a transformation of a different browser for that web page (e.g., resulting DOMs for a particular web page or application may be different across browsers). In embodiments, information in a DOM generated by a particular browser may be used by the browser to may be used by the browser to render the particular web page or application and may include run time values. Run time values may correspond to elements and/or attributes actually used by the browser at run time, and run time may include rending the web page or application to the user.

As will be described in detail below, the system 10 may be include a cross-browser web application tool 10A. Cross-browser web application tool 10A may be configured to compare and evaluate web applications or web pages rendered by one or more web browsers relative to such web applications or web pages rendered by one or more other web browsers (e.g., to determine discrepancies, if any, between the transformations conducted by the various browsers). In one embodiment, any web browser being compared and evaluated against any other web browser may reside on (e.g., stored within a memory within), and be executed by one or more processors operating on, the computing device 12, any "virtual machine" operating on the computing device 12 via the network 32, any of the one or more servers 34, any of the one or more computing devices $36_1$-$36_M$ coupled to any of the one or more servers 34, and/or any of the computing devices 38.

The computing device 12 may be embodied as any type of computing device (e.g., without limitation, a personal computer (PC), laptop computer, notebook computer, tablet, and/or smartphone, or the like) or other computing device capable of performing the functions described herein. In the illustrative embodiment of FIG. 1, the computing device 12 shown by example includes a processor 14, an I/O subsystem 16, a memory device (or devices) 18, a data storage device (or devices) 20, one or more peripheral devices 22, and/or communication circuitry/devices 30. It should be appreciated that the computing device 12 may include other components, sub-components, and/or devices commonly found in computing devices.

The processor 14 of the computing device 12 may be embodied as one or more of any type of processor capable of executing software/firmware, such as a microprocessor, digital signal processor, microcontroller, or the like. The processor 12 may be a single processor or include multiple processors. The I/O subsystem 16 of the computing device 12 may be embodied as circuitry and/or components to facilitate input/output operations with the processor 14 and/or other components of the computing device 12. The processor 14 may be communicatively coupled to the I/O subsystem 16.

The memory 18 of the computing device 12 may be embodied as or otherwise include one or more conventional volatile and/or non-volatile memory devices. The memory 18 is communicatively coupled to the I/O subsystem 16 via a number of signal paths. Although only a single memory device 18 is illustrated in FIG. 1, the computing device 12 may, in other embodiments, include additional memory devices and/or be coupled directly to one or more remote memory devices. Various data and/or software, e.g., in the form of instructions executable by the processor 14, may be stored in the memory 18, and examples of some such software will be described in detail hereinafter.

The data storage 20 is also communicatively coupled to the I/O subsystem 16 via one or more signal paths, and may be embodied as one or more of any type of device or devices configured for the short-term or long-term storage of data such as, for example, one or more memory devices and circuits, memory cards, hard disk drives, solid-state drives, or other data storage devices. Although only a single data storage device 20 is illustrated in FIG. 1, the computing device 12 may, in other embodiments, include additional data storage devices and/or be coupled directly or indirectly to one or more remote data storage devices.

In the illustrated embodiment, the computing device 12 further includes a number of peripheral devices 22. Such peripheral devices 22 may include any number of additional input/output devices, interface devices, and/or other peripheral devices. For example, as illustrated in FIG. 1 the peripheral devices 22 may include, without limitation, one or more display devices/monitors 24, at least one keyboard 26 and one or more user input devices 28, such as, without limitation a point and select device (e.g., a mouse, a touchscreen, or similar). The peripheral devices 22 may further include one or more data input devices (e.g., a memory disk reading device), one or more input ports for connecting to one or more corresponding memory devices (e.g., one or more universal serial bus (USB) input ports), or the like. It will be understood that the peripheral devices 22 may alternatively or additionally include one or more other conventional input and/or output devices. In embodiments, the peripheral devices 22 may be communicatively coupled to the I/O subsystem 16 via one or more signal paths. In embodiments, processor 14 may be disposed remotely from one or more of the peripheral devices. For example, the tool 10A may be provided in a software as a service (SAAS) configuration. A SAAS configuration may include a user using the tool 10A via peripheral devices 22 (e.g., a display device/monitor 24, a keyboard 26, and/or point-and-click device 28) disposed at a distance from, but connected to (e.g., connected via a network, such as the internet), processor 14. In a SAAS configuration, the cross-browser web application testing tool may be stored in and/or run by the one or more servers 34, the one or more remote computing devices $36_1$-$36_M$, and/or the one or more computing devices 38, any of which may be disposed at a distance (e.g., feet, miles, etc.) from peripheral devices 22.

The communication device/circuitry 30 of the computing device 12 may include any number of devices and/or circuitry for enabling communications between the computing device 12 and any of one or more remote computing devices 38, one or more remote servers 34 and/or one or more remote web servers $40_1$-$40_N$. In embodiments, for example only, communication between the computing device 12 and any of the remote computing devices 38, one or more remote servers 34 and/or one or more remote web servers $40_1$-$40_N$ may take place at least partially wirelessly via the network 40. Network 40 may represent, for example only, a private local area network (LAN), a personal area network (PAN), a storage area network (SAN), backbone network, a global area network (GAN), a wide area network (WAN), and/or a collection of any such computer networks such as an intranet, extranet or the Internet (e.g., a global system of interconnected networks/computing devices upon which various applications or service run including, for example only, the World Wide Web). In embodiments, the communication path between the computing device 12 and any of one or more remote computing devices 38, one or more remote servers 34 and/or one or more remote web servers $40_1$-$40_N$ may be a non-private (e.g., public) network and/or may be, in whole or in part, a wired connection. Examples of such a public network may include, but are not be limited to, a global system of interconnected computers such as the Internet, a wireless communication network such as a local area network (LAN), a personal area network (PAN), a storage area network (SAN), a backbone network, a global area network (GAN), a wide area network (WAN), and/or a collection of any such computer networks. In embodiments, the communication circuitry 30 may be configured to use any one or more of, or a combination of, conventional secure and/or unsecure communication protocols to communicate with any of one or more remote computing devices 38, one or more remote servers 34 and/or one or more remote web servers $40_1$-$40_N$. As such, the network 32 may include any number of additional devices, such as additional computers, routers, and/or switches, which may facilitate communications between the computing device 12 and any of one or more remote computing devices 38, one or more remote servers 34 and/or one or more remote web servers $40_1$-$40_N$. In embodiments, the communication circuitry 30 may be communicatively coupled to the I/O subsystem 16 via one or more signal paths.

The one or more remote servers 34, the one or more remote computing devices 38 and/or the one or more remote web servers $40_1$-$40_N$ may be substantially similar to the computing device 12 as just described, and may include similar components. As such, the description provided above of the components of the computing device 12 may be equally applicable to such similar components of the one or more remote servers 34, the one or more remote computing devices 38 and/or the one or more remote web servers $40_1$-$40_N$, and are not repeated herein. Of course, it should be appreciated that in some embodiments any of the one or more remote servers 34, the one or more remote computing devices 38 and/or the one or more remote web servers $40_1$-$40_N$ may be dissimilar to others of the one or more remote servers 34, the one or more remote computing devices 38 and/or the one or more remote web servers $40_1$-$40_N$.

Figure 2:
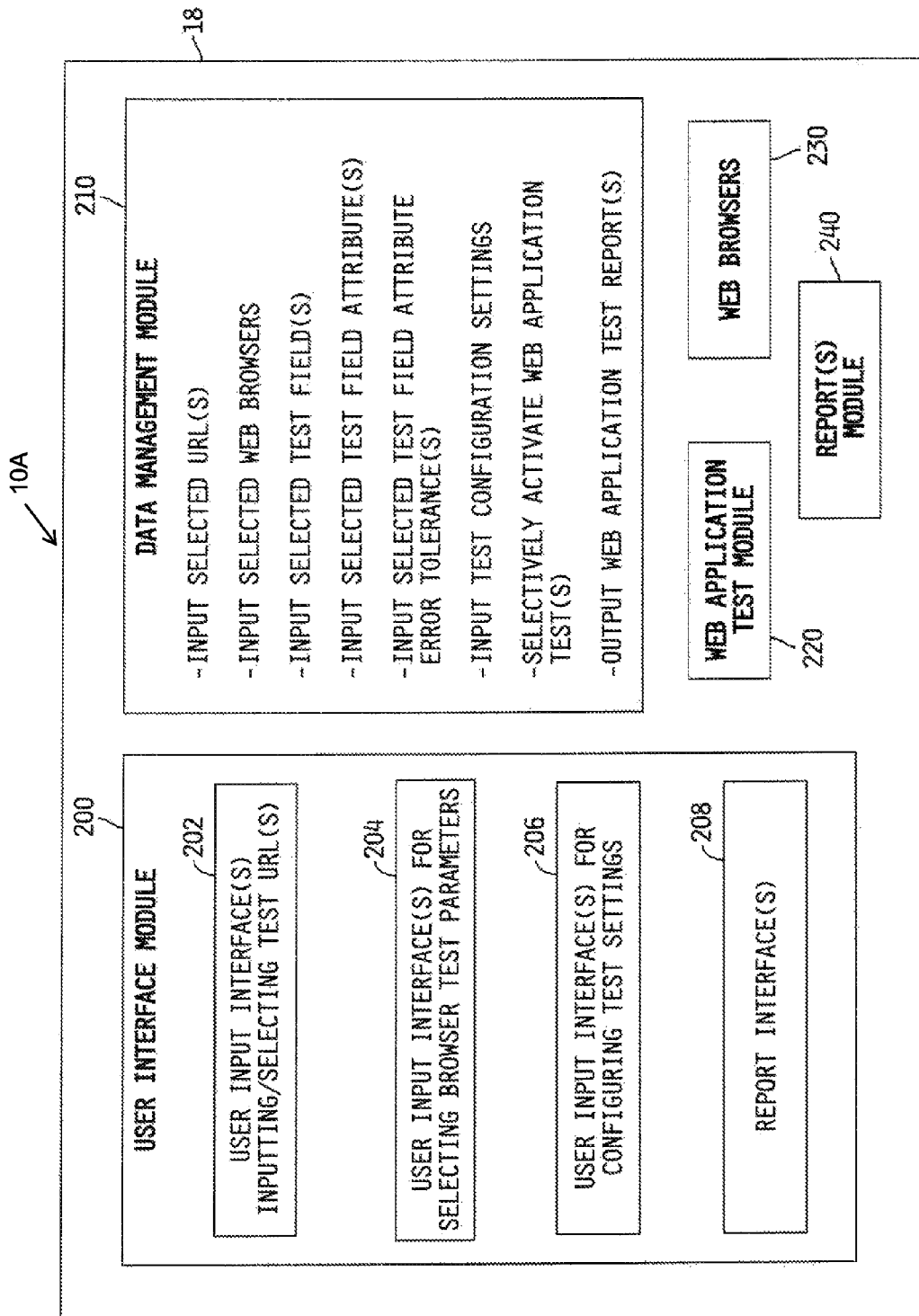
FIG. 2 is a simplified block diagram representation of an embodiment of the memory unit illustrated in FIG. 1.

Referring now to FIG. 2, a simplified block diagram is shown of a software environment of the system of FIG. 1. In the illustrated embodiment, the cross-browser web application testing tool may be implemented in the form of instructions stored in the memory 18 of the computing device 12 and executable by the processor 14 to perform the functions described herein. Alternatively or additionally, the instructions may be stored in whole or in part in the data storage 20. Alternatively or additionally still, the instructions may be stored in whole or in part in one or more memory devices carried by or in communication with any of the one or more servers 34, the one or more remote computing devices $36_1$-$36_M$, and/or the one or more computing devices 38, and accessed by the processor 14 via the network 32. Alternatively or additionally still, any one or more of the one or more servers 34, the one or more computing devices $36_1$-$36_M$ and/or the one or more computing devices 38 may include one or more processors which execute all or part of the instructions, and input/output data may be exchanged between the processor 14 and any such one or more processors via the network 32. In embodiments, the software environment of the cross-browser web application testing tool 10A (e.g., as generally illustrated in FIG. 2) may include a user interface module 200, a data management module 210, a web application test module 220, a web browsers library 230, and/or a report module 240.

The user interface module 200 of the tool 10A may include a number of graphic user interfaces (GUIs) for receiving user input and for producing reports generated by the cross-browser web application testing tool 10A. In the illustrated embodiment, for example, the user interface module 200 includes one or more URL user interfaces 202, one or browser test parameter user interfaces 204, one or more test setting configuration user interfaces 206 and one or more report interfaces 208. The one or more URL user interfaces 202 may include one or more user interfaces that may permit a user to input one or more selected universal resource locators (URLs) (e.g., one or more web addresses of one or more corresponding web sites that produce one or more web pages) that the user may enter and/or select for conducting cross-browser web application testing. The one or more browser test parameter user interfaces 204 may include one or more user interfaces for selecting two or more web browsers (e.g., from the web browsers library 230 or from a web browser library associated with a remote computing device), for comparison using the cross-browser web application testing tool 10A. Test parameter interfaces 204 may include one or more user interfaces for selecting various test parameters that will be used by the cross-browser web application testing tool 10A to conduct such comparisons.

In embodiments, the one or more test configuration user interfaces 206 may include one or more user interfaces via which a user may configure one or more of the browser test parameter interfaces 204. Configuration interfaces 206 may permit a user to adjust advanced settings, which may include permitting a user to select one or more desired browser test parameters that should be made available for user selection via test parameter interfaces 204 (e.g., in some cases, not all parameters will be desired for presentation via interface 204). The one or more report interfaces 208 may include one or more GUIs via which the cross-browser web application testing tool 10A may graphically present to the user the results of one or more cross-browser web application tests. It will be understood that while some embodiments may include all such interfaces, other embodiments may include one or various subsets of such interfaces and/or may include one or more additional user interfaces. Examples of user interfaces are illustrated in one or more of FIGS. 4-6.

The data management module 210 may be configured to manage the input of information to, user control of, and/or one or more reports generated by, the cross-browser web application testing tool 10A. For example, the data management module 210 may manage the input to the tool 10A. For example, and without limitation, data management module 210 may receive data from user interface module 200. Data received by data management module from user interface module may include (i) one or more user-selected URLs, (ii) one or more user-selected web browsers, (iii) one or more user-selected web application test fields, (iv) one or more user-selected test field attributes, (v) one or more user-selected test field attribute error tolerances, (vi) one or more user-selected test configuration settings, and/or (vii) user input to selectively activate one or more web application tests to be conducted by the cross-browser web application testing tool 10A. In embodiments, the data management module 210 may be configured to receive reports (e.g., from report module 240, described below) and provide the reports to the user interface module 200. The data management module 210 may provide the reports to the user interface module 200 for graphic display of one or more of the reports, which may include the results of one or more cross-browser web application tests.

The web application test module 220 may be configured to conduct cross-browser testing of selected web applications based on information supplied by a user (e.g., via the user interface module 200). As will be described in greater detail below, the web application test module 220 may be operable to access a user-selected web page via network 32 and to compare each user-selected attribute of each user-selected test field within the user-selected web page rendered by one user-selected browser with a corresponding attribute of a corresponding test field within the user-selected web page rendered by at least one other user-selected browser. A comparison of attributes may be a function of a user-selected tolerance value associated with each user-selected attribute.

The web browser library 230 may include two or more web browsers from which the user may select a base browser and at least one target browser for conducting a cross-browser web application comparison test using the cross-browser web application testing tool 10A. In embodiments, the web browser library 230 is contained within the memory 18 and/or within the data storage 20 of the user computing device 12. Additionally or alternatively, the web browser library 230 may be contained, in whole or in part, within, or accessible by, any of the one or more servers 34, any of the computing devices $36_1$-$36_M$ coupled thereto and/or any of the computing devices 38. In some embodiments, a user may select two or more web browsers from the web browser library 230 contained within the memory 18 and/or within the data storage 20 of the user computing device 12 for comparison by the cross-browser web application testing tool 10A. In other embodiments, a user may select one or more web browsers from the web browser library 230 contained within the memory 18 and/or within the data storage 20 of the user computing device 12 and one or more other web browsers on a remote server 34 and/or computing device $36_1$-$36_M$, 38 for cross-browser web application testing. In embodiments, a user may select two or more web browsers on a remote server 34 and/or computing device $36_1$-$36_M$, 38 for cross-browser web application testing. In embodiments, the web browser library 230 may include one or more versions of one or more different web browsers, examples of which may include, but are not limited to, Internet Explorer®, Firefox®, Google Chrome™, Safari® and/or Opera™. Web browser library 230 may include desktop and/or mobile versions of each web browser, and/or may include different operating system versions of the same browser (e.g., Chrome™ for Mac™ OS, Chrome™ for Windows™, and/or Chrome™ for Android™, and/or Chrome™ for iOS™). Web browser library 230 may be in communication with one or more of the user interface module, 200, the data management module 210, the web application test module 22, and/or the report module 240. For example, and without limitation, web browser library 230 may communicate with the user interface module 200, which may allow user interface module to display a list of browsers located in the web browser library 230. Additionally or alternatively, the web browser library 230 may communicate with the web application test module 220, which may include the web application test module 220 providing a user-selected URL to the web browser library 230 for rendering by one or more browsers of web browser library 230.

The report module 240 may be configured to produce a number of different reports detailing the results of the cross-browser web application testing comparisons that may be made by the web application test module 220. For example, and without limitation, report module 240 may receive results from web application test module 220, generate one or more reports according to the results, and provide the reports to the report interface 208. The report interface 208 may be configured as a GUI and/or may present the reports to the user for viewing.

Figure 3A:
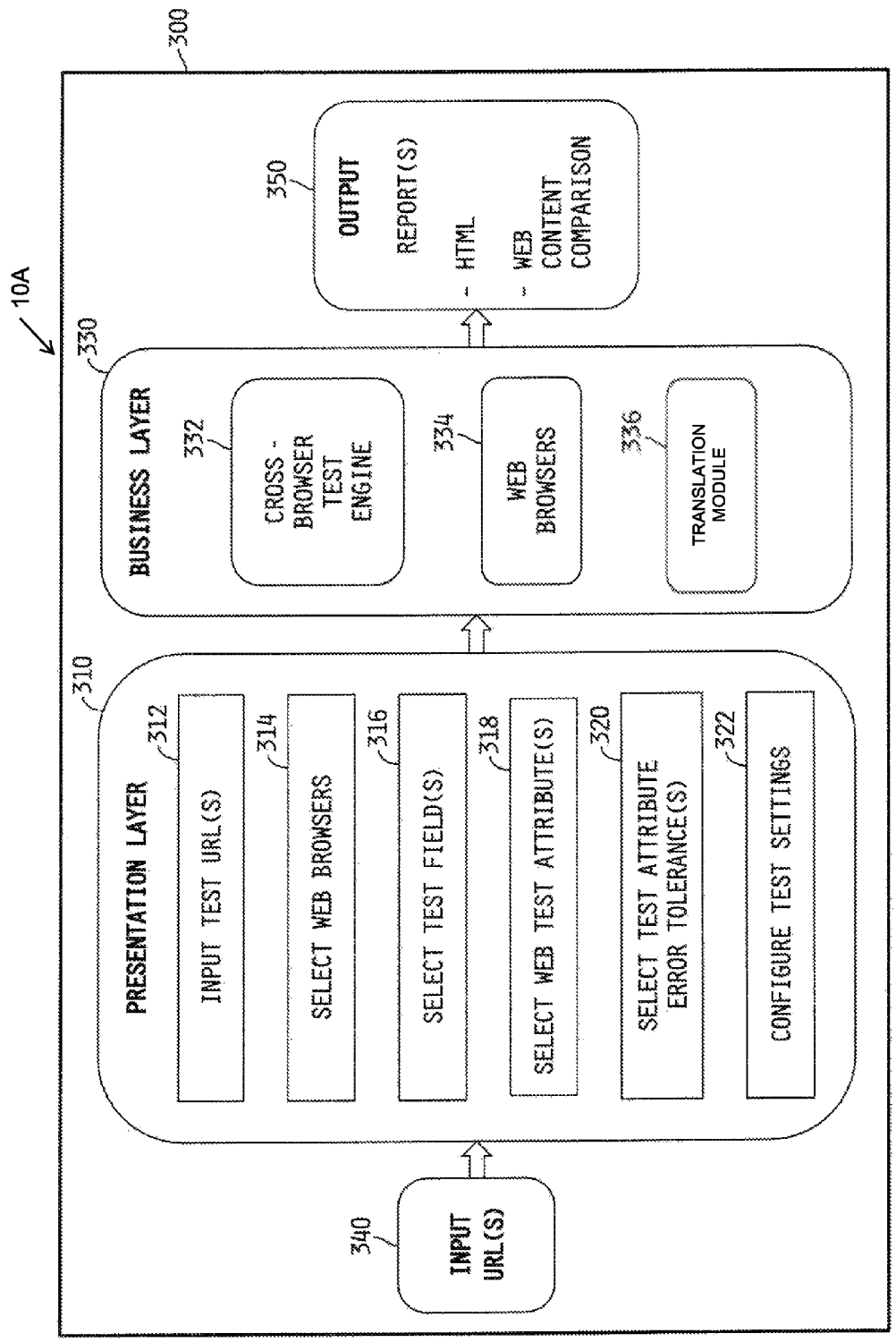
FIG. 3A is a simplified block diagram depicting an example architecture of an embodiment of the cross-browser web application testing tool.

FIG. 3A is a block diagram generally illustrating an example architecture of an embodiment cross-browser web application testing tool 10A. The architecture 300 includes, but is not limited to a presentation layer 312, a business layer 330 and an output 350. The presentation layer 310 provides an interface 312, which may include interface 202, for the user to input one or more test URLs 340 to be used by the cross-browser web application testing tool 10A for comparison of two or more web browsers. Selected URL(s) may be accessed from one or more of the web servers $40_1$-$40_N$ via the network 32, which may include public and/or private portions.

In embodiments, the presentation layer 310 may provide interface 204 as a GUI for the user to view and/or for the user to enter information. Interface 204 may include an interface 314 for the user to select two or more web browsers for comparison by the cross-browser web application testing tool 10A, an interface 316 for the user to select one or more test fields, each corresponding to a specified web element to test within each selected web browser, an interface 318 for the user to select one or more web test attributes, each corresponding to a specified property of the various selected web elements, and/or an interface 320 for the user to select one or more test attribute error tolerance values, each corresponding to an allowed rendering error of a corresponding one of the various selected web test attributes. In one embodiment, the interfaces 314, 316, 318 and 320 are illustratively graphic user interfaces in the form of menus or lists from which the user may select the various test parameters. In such embodiments, the interface 204 may include an interface 322 for the user to input, delete and/or select items to be contained in one or more of the menus or lists.

In embodiments, the business layer 330 may contain components that implement the logic and rules responsible for the functionality of the cross-browser web application testing tool 10A. These components may include, but are not limited to a cross-browser test engine 332 and the two or more web browsers 334. The cross-browser test engine 332 may be configured for conducting the comparisons and evaluations of the various selected test field attributes within each selected test field of the selected URL as rendered by each of two or more selected web browsers. In embodiments, the cross-browser test engine 332 may be operable to conduct such comparisons and evaluations by obtaining run time values of each selected test attribute of each selected test field within the selected web page rendered by a user-selected base browser. The test engine 332 may then obtain the run time values of the same corresponding test attributes/test fields within the selected web page rendered by one or more user-selected target browsers. The test engine 332 may then compare the attributes from the base browser with the attributes from the one or more target browsers.

In embodiments, it may be desirable for the cross-browser test engine 332 to conduct cross-browser web application testing on such run time values, as opposed to earlier development phases (e.g., design, compilation, deployment). For example, user interface distortions (e.g., between different web browsers and/or among different operating systems) may obscure or corrupt cross-browser rendering comparisons if such testing is conducted on test field/attribute values prior to run time. Such user interface distortions may result, for example, during the design phase (e.g., if the web application developer has not yet created or defined style properties and/or style classes). User interface distortions may also result from the compilation phase (e.g., if style property definitions and/or classes are not properly compiled due to various factors). User interface distortions may also result from the deployment phase (e.g., if defined properties and/or classes are not properly deployed due to invalid references, conflicts) and/or from other causes prior to run time. Conducting cross-browser application testing on run time values may allow for distortions resulting from each of the design phase, the compilation phase, and the deployment phase to be detected.

In embodiments, the cross-browser web application testing tool 10A may support (e.g., may be used with) various different operating systems, examples of which include, but are not limited to, Windows® (32-bit and 64-bit), Linux®, and Mac OS®. In embodiments, the cross-browser application testing tool 10A may be implemented via a cross-platform software development tool such as Java (e.g., any version of JDK 1.7/JRE 6 or newer), which may allow the cross-browser web application testing tool 10A to operate in all of the operating systems, browsers and browser versions supported by the cross-platform development tool.

In embodiments, the cross-browser test engine 332 may be operable to generate a number of different reports 350 detailing the results of web application testing carried out thereby. Examples of some such reports 350 are generally illustrated in FIGS. 6-7B.

Referring to FIG. 3B, a flow chart for an embodiment of cross-browser testing tool 10A is generally illustrated. In steps 360, 362, 364, 366, 368, 370, 372, 374, 376, 378, and 380, cross-browser testing tool 10A may receive a selected URL from a user, receive a selection of two or more browsers from the user, receive a selection of fields from the user, receive a selection of attributes for the selected fields from the user, receive error tolerances for the selected attributes, cause the selected browsers to render the web page corresponding to the selected URL, compare (e.g., at a root level, such as generally described below) the web page as rendered by a first of the selected browsers with the web page as rendered by a second of the selected browsers, apply the selected tolerances to any discrepancies between the renderings, flag any discrepancies outside of the selected tolerances as errors, generate an error report, and display the error report.

Figure 4A:
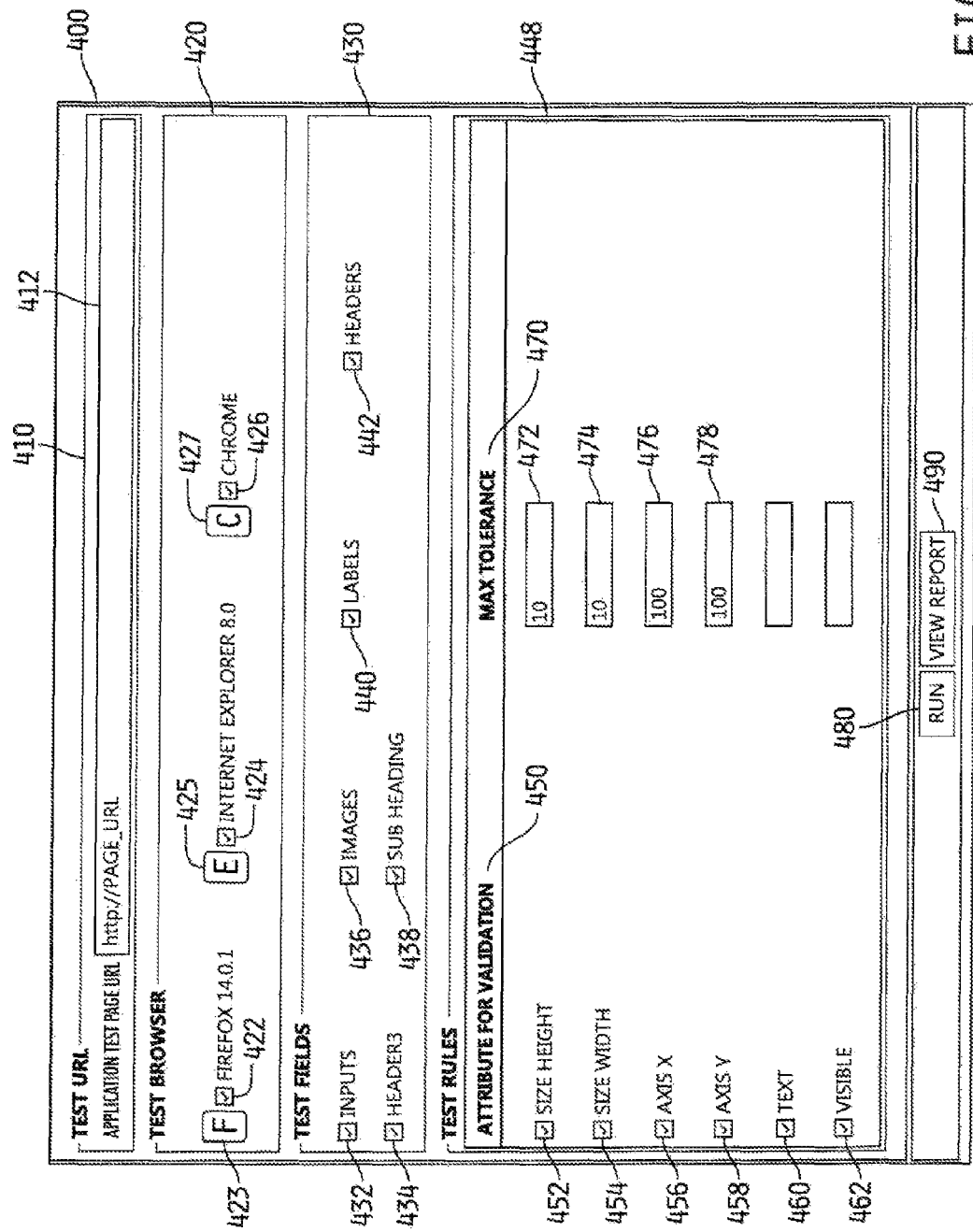
FIGS. 4A-4C are example graphical user interfaces (GUIs) illustrating processes for inputting a test URL and selecting cross-browser testing parameters in embodiments of the cross-browser web application testing tool.
Figure 4B:
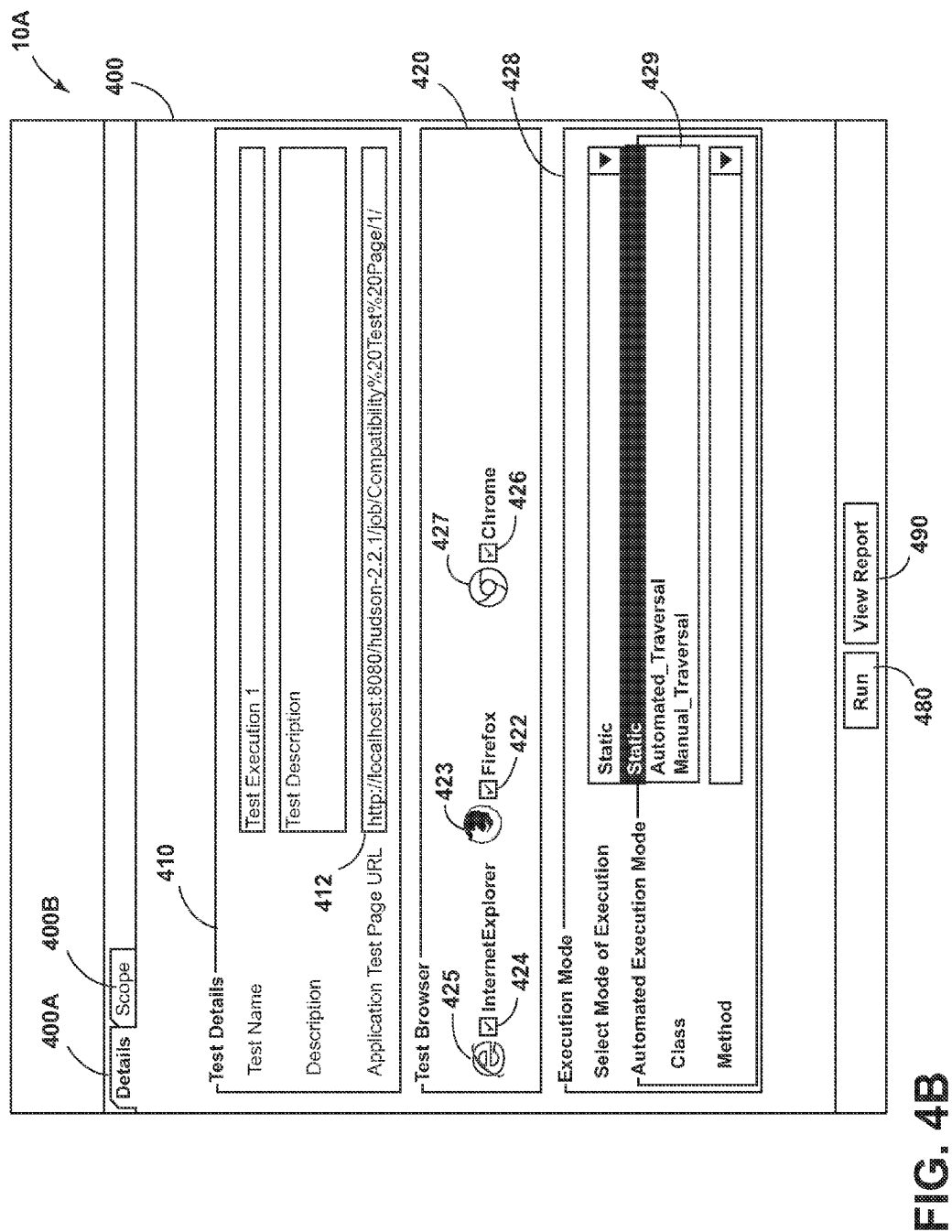
Figure 4C:
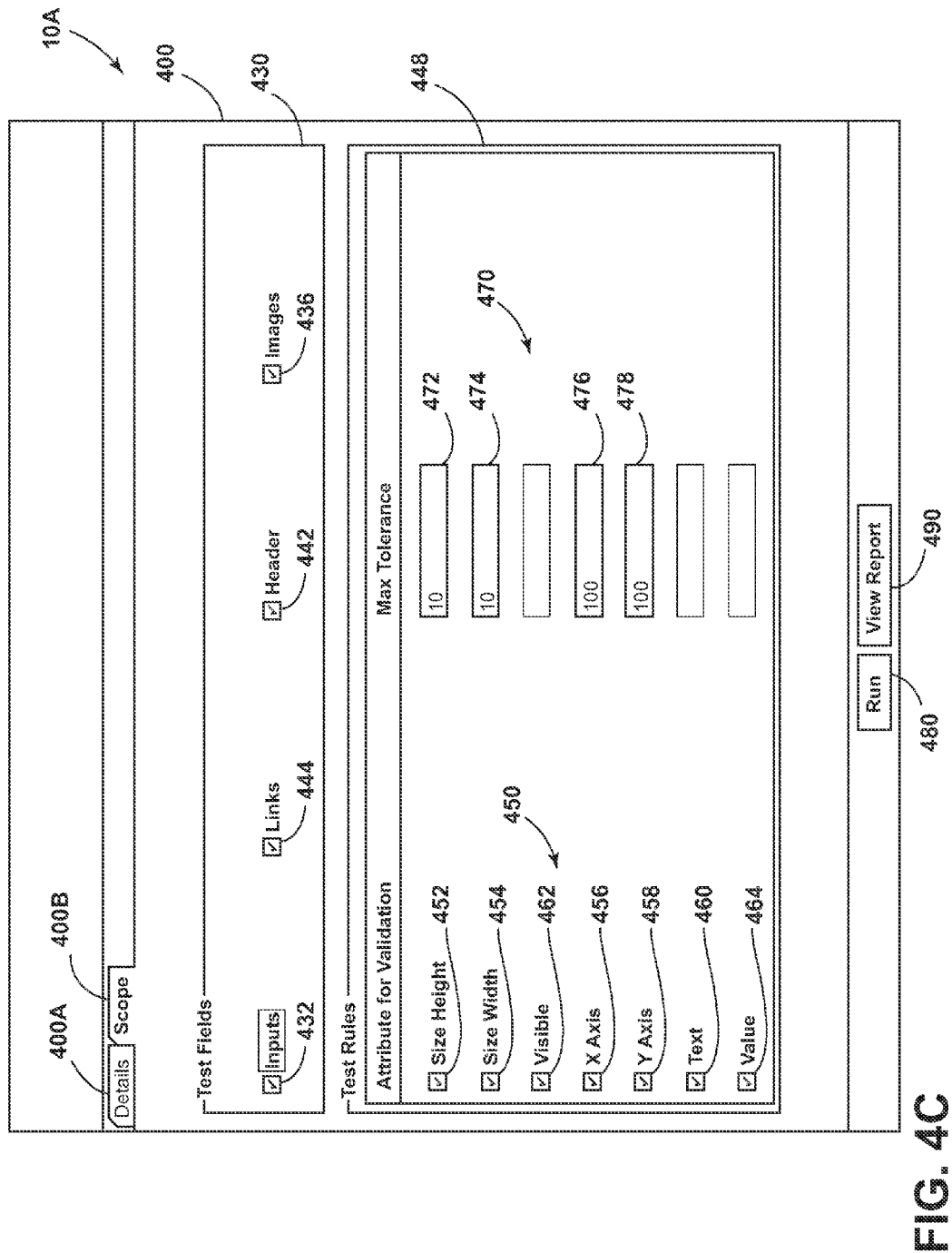

Referring now to FIGS. 4A-4C, examples of GUI 400 are shown and may be displayed by the processor 14 on one or more display devices/monitors 24. A user of the system 10 may supply cross-browser web application test parameters to the cross-browser web application testing tool 10A via GUI 400. A user may also be able to conduct cross-browser web application testing using the cross-browser web application testing tool 10A partially, primarily, or entirely via GUI 400. In embodiments, GUI 400 may be configured as a single screen (e.g. as generally illustrated in FIG. 4A) and/or may include a tabbed format (e.g., as generally illustrated in FIGS. 4B and 4C). For example, and without limitation, GUI may include a "Details" tab 400A and/or a "Scope" tab 400B. In embodiments, the GUI 400 may include a test URL section 410 (which may correspond to interface 202) that may include a text box 412 via which a user may be able to enter a URL for cross-browser testing of two or more selected web browsers. The URL may identify a web site, illustratively a particular web page of a specified web site, which the computing device 12 may access via the network 32 and/or one or more of the web servers 40₁-40_N.

In embodiments, GUI 400 may include a test browser menu or list 420 that may display two or more different web browsers which the user may select for cross-browser web application testing. Various different versions of any single web browser (e.g., Version 1, Version 2, etc.) may also be tested, and in this regard the test browser menu 420 may illustratively include two or more different versions of the same web browser. The user may select two or more of the web browsers displayed in the menu 420. If only two are selected, the cross-browser web application testing tool 10A may test one against the other. If more than two are selected, the cross-browser web application testing tool 10A may test each combination (e.g., a selected base browser relative to other selected browsers). Testing of each combination may be conducted sequentially (e.g., one combination after another), and/or may be conducted in parallel (e.g., multiple combinations at the same time), which may make the testing more efficient). In embodiments, as generally illustrated in FIG. 4A, the test browser menu 420 illustratively includes a Firefox® 14.0.1 selection box 422 alongside a Firefox® identifying icon 423, an Internet Explorer® 8.0 selection box 424 alongside an Internet Explorer® identifying icon 425 and a Google Chrome™ selection box 426 alongside a Google Chrome™ identifying icon 427. In embodiments, the user may select one or more of the browsers from the browser menu 420 (e.g., via radio buttons 422, 424, 426). In embodiments, certain browsers may be automatically selected by the tool 10A, which may include selecting the most commonly used browsers (e.g., a top 5, top 10, etc.). The cross-browser web application testing tool 10A may prompt a user to select the base/source browser so that at run time, values from base browser can be captured as expected values and can be used to validate other selected target browsers in a parallel mode. Validating target browsers relative to the base browser may enable highlighting elements that may be leading to distortion in targeted browsers. Once the validation has completed, a user will still have an option to compare the values for the selected fields for the selected Firefox® web browser against the selected Internet Explorer® web browser, the selected Firefox® web browser against the selected Chrome™ web browser and the selected Internet Explorer® web browser against the selected Chrome™ web browser.

In embodiments, GUI 400 may include an "Execution Mode" area 428, which may allow a user to select from a list 429 of execution modes in which the cross-browser web application testing tool 10A may operate. The list 429 of execution modes may include a static mode, an automated traversal mode, and/or a manual traversal mode. For example, an automated mode may include the cross-browser web application tool 10A being configured to leverage preexisting automation scripts to navigate to the intended screen by simulating user action with respect to keyboard or mouse actions.

In embodiments, the tool 10A may be configured to test web applications in at least two dimensions, which may include testing elements of a web application and testing properties and/or attributes corresponding to those elements. The GUI 400 may include a test field menu or list 430 that may display one or more user-selectable web application test fields that may each correspond to a specified web element within the user-selected web page. In embodiments, such as generally illustrated in FIGS. 4A and 4C, the test field menu 430 may include an "Inputs" selection box 432, a "Header3" selection box 434, an "Images" selection box 436, a "sub heading" selection box 438, a "Labels" selection box 440, a "Headers" selection box 442, and/or a "Links" selection box 444. Each of the selection boxes 432-444 may correspond to different web application test fields that a user may select for testing and comparison between the selected web browsers. Unselected test field elements may not be tested by the cross-browser web application testing tool 10A, and the menu 430 may thus provide the user with flexibility in the number and/or types of web elements to test. It will be understood that the test field menu 430 may include more, fewer and/or different web application test fields than what is illustrated by example in FIGS. 4A and 4C, and one illustrative web application test field configuration application of the cross-browser web application testing tool 10A will be described in detail below with respect to FIGS. 5A and 5D.

In embodiments, the GUI 400 may include a test field attribute menu or list 448 that may display one or more user-selectable web application test attributes that may each correspond to a specified property of a web element within the user-selected (e.g., via URL) web page. In embodiments, such as generally illustrated in FIGS. 4A and 4C, the test field attribute menu 448 may include an attribute menu 450 and one or more error tolerance fields 470. For example, and without limitation, the tool 10A may provide GUI 400 to a display device 26, and a user may be able to specify an error tolerance value for at least some of test field attributes listed in the attribute menu 450 via error tolerance fields 470 of GUI 400. In the embodiments, the attribute menu 450 may includes a "Size Height" selection box 452, a "Size Width" selection box 454, an "Axis x" selection box 456, an "Axis y" selection box 458, a "Text" selection box 460, a "Visible" selection box 462, and/or a "Value" selection box 464. Each of the selection boxes 452-464 may correspond to different web application test field attributes that a user may select for testing and comparison between the selected web browsers. Unselected test field attributes will not be tested by the cross-browser web application testing tool 10A, and the menu 450 may thus provide the user with flexibility in the number and/or types of web element attributes to test. It will be understood that the attribute menu 450 may include more, fewer and/or different web application test field attributes than what is illustrated by example in FIGS. 4A and 4C. It will also be understood that one illustrative example of an embodiment of a web application test field attribute configuration application of the cross-browser web application testing tool 10A will be described in detail below with respect to FIGS. 5A and 5E.

In embodiments, the error tolerance field 470 of the test field attribute menu 448 may contain one or more error tolerance value fields (e.g., fields 472-474) for each applicable test field attribute selected from in the attribute menu 450. The error tolerance value associated with each such test field attribute may correspond to a maximum allowed rendering error between selected web browsers of the associated test field attribute. For example, and without limitation, the "Size Height" test field attribute 452 has a maximum error tolerance value of 10 (e.g., as specified in error tolerance value field 472), whereas the "Axis X" test field attribute has a maximum error tolerance of 100 (e.g., as specified in error tolerance value field 476). In embodiments, such as generally illustrated in FIGS. 4A and 4C, the maximum error tolerance values may range from 0 to 100, and a lower maximum error tolerance value may requires a more accurate match between the associated test field attribute rendered by one of the selected web browsers (e.g., the selected base browser) as compared to that test field attribute rendered by another of the selected web browsers (e.g., a target browser) than does a higher maximum error tolerance value. Thus, a maximum error tolerance value of 10 may require a more accurate match of the associated test field attribute rendered by each of the selected web browsers than does a maximum error tolerance value of 100. This feature may provide flexibility when testing web application renderings between two browsers by allowing the user to selectively focus rendering accuracy on one or more desired test field attributes. In embodiments, the maximum error tolerance values may be specified using a maximum error value configuration application, an example of which will be described in detail below with respect to FIGS. 5A and 5E. In embodiments, such as generally illustrated in FIGS. 4A and 4C, the maximum error tolerance values, when enabled, may include text boxes, e.g., 472-478, via which the user can modify any of the one or more maximum error tolerance values via the GUI 400. In embodiments, this feature may provide further flexibility by allowing the user to emphasize accuracy levels of one or more test field attributes and/or deemphasize the accuracy levels of one or more others directly from the GUI 400 while running one or more cross-browser web application tests using the cross-browser web application testing tool 10A.

In embodiments, such as generally illustrated in FIGS. 4A and 4C, maximum error tolerance values may not be applicable to some test field attributes, such as, for example only, "Text" 460, "Visible" 462, and/or "Value" 464. The "Visible" test field attribute, for example, may only include two possible values (e.g., visible or not visible). As a determination as to whether the associated test field is visible when rendered by the selected web browsers may not include more than two values, specifying an error tolerance may not be advantageous. For test field attributes for which specifying error tolerance values may not be advantageous or desired, the tool may provide the user with the flexibility to disable the associated maximum error tolerance values for such attributes, as will be described in greater detail with respect to FIGS. 5A and 5E, In embodiments, if the user has entered a desired URL in the text box 412, has selected two or more web browsers in the web browser menu 420, has selected one or more test fields in the test field menu 430, has selected one or more test field attributes in the attribute menu 450, and/or has selected or adjusted one or more maximum error tolerance values in the maximum error tolerance field 470, the user may select a "Run" button 480 to carry out a cross-browser web application test of the selected web application (e.g., the web page specified by the user-entered URL) using the selected web browsers and selected cross-browser test parameters. Following the conclusion of any such test, the user may select a "View Report" button 490 to view one or more results of the cross-browser web application test.

In embodiments, cross-browser testing of a selected web application may be carried out by the processor 14 by accessing the corresponding web page specified by the user-entered URL via network 32, and comparing each selected attribute of each selected test field within the web page rendered by one of the selected browsers (e.g., a source browser) with a corresponding attribute of a corresponding test field within the web page rendered by the another of the selected browsers (e.g., a target browser). In embodiments, cross-browser testing may be carried out as a function of selected tolerance value associated with each selected attribute. The processor 14 may be operable to generate one or more reports according to the results of the test (e.g., of the comparisons made by the processor 14). Illustrative examples of some such reports are generally illustrated in FIGS. 6A-7B.

Figure 5A:
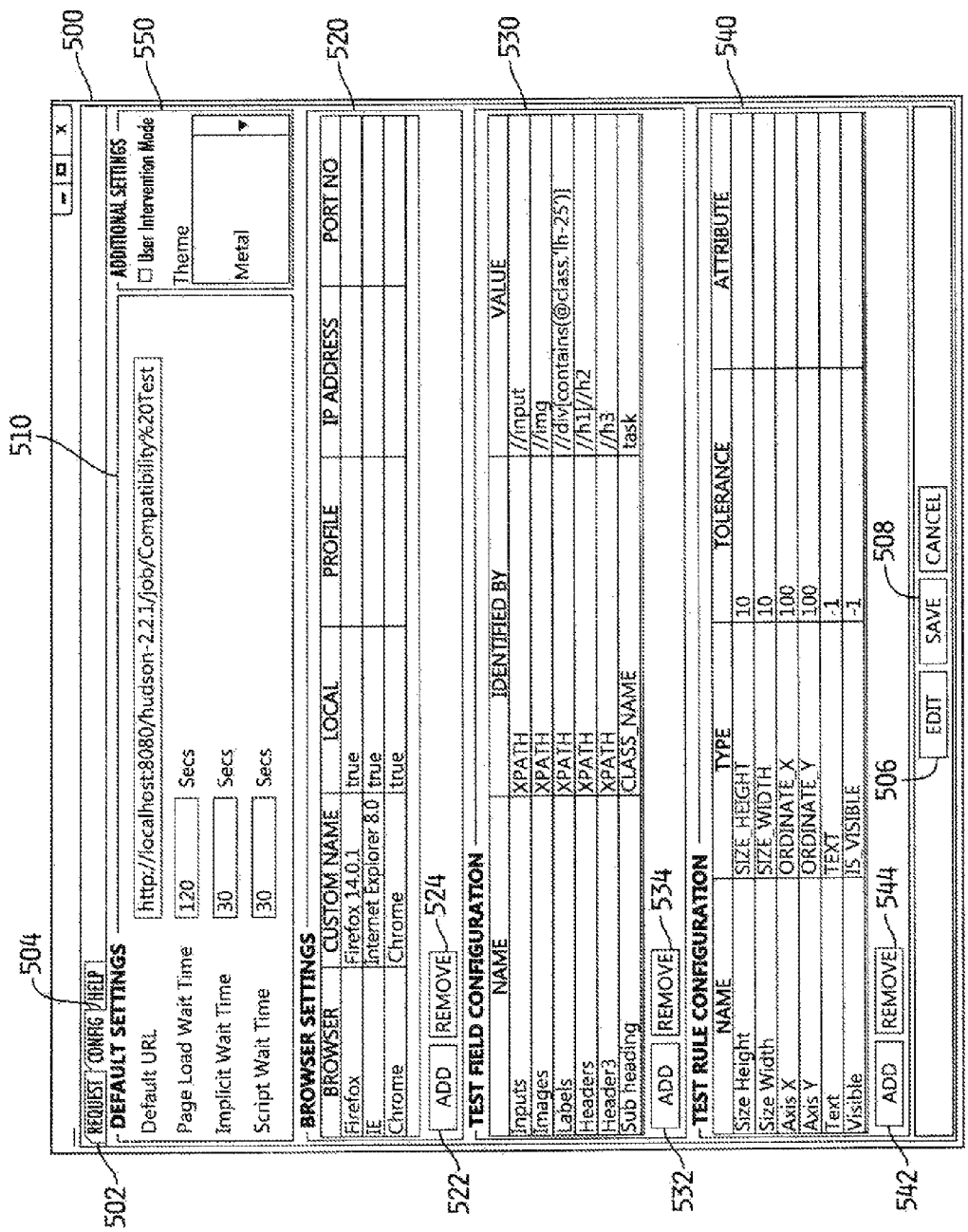
FIGS. 5A-5F are example GUIs illustrating processes for configuring selections of various cross-browser testing parameters in embodiments of the cross-browser web application testing tool.
Figure 5B:
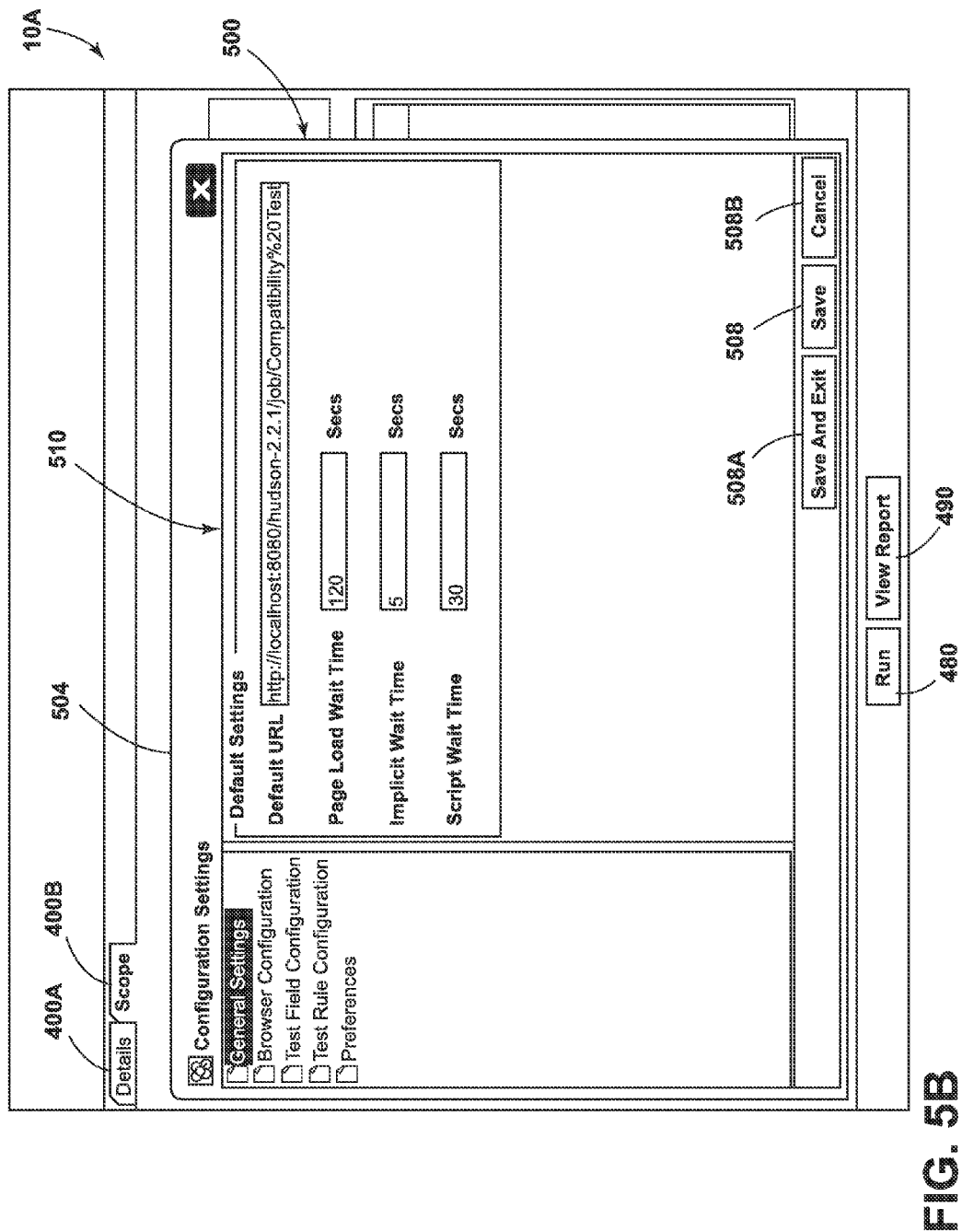
Figure 5C:
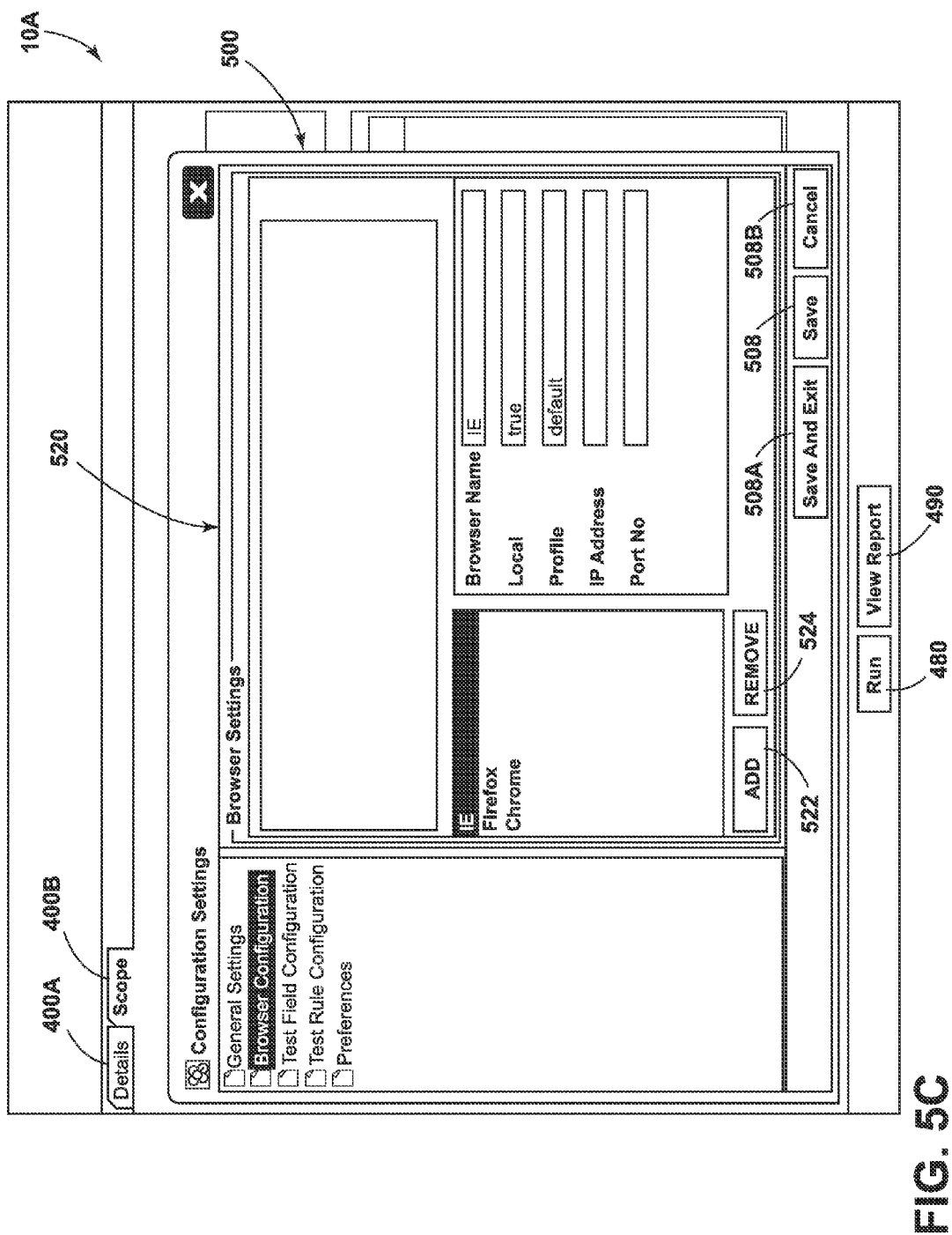
Figure 5D:
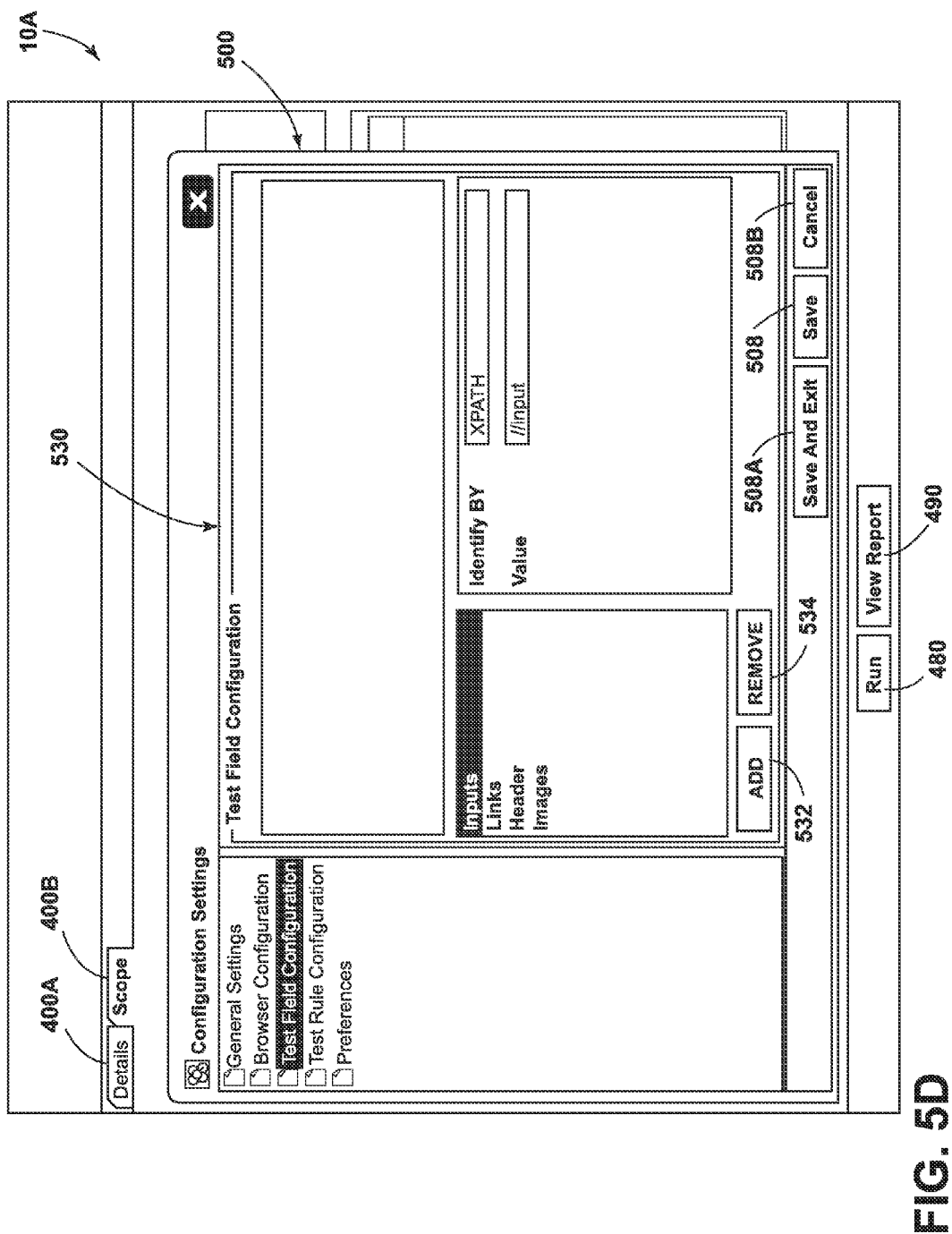
Figure 5E:
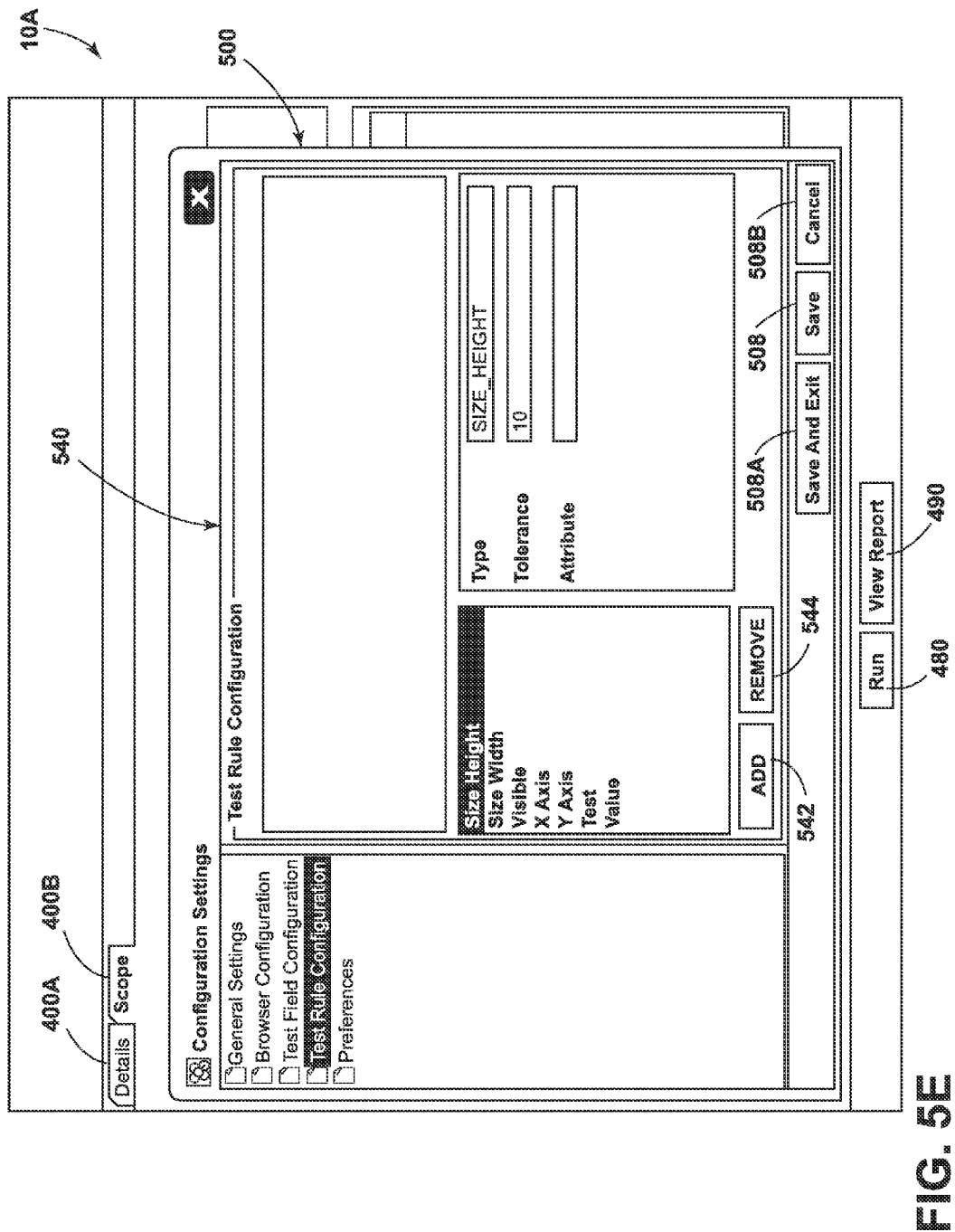
Figure 5F:
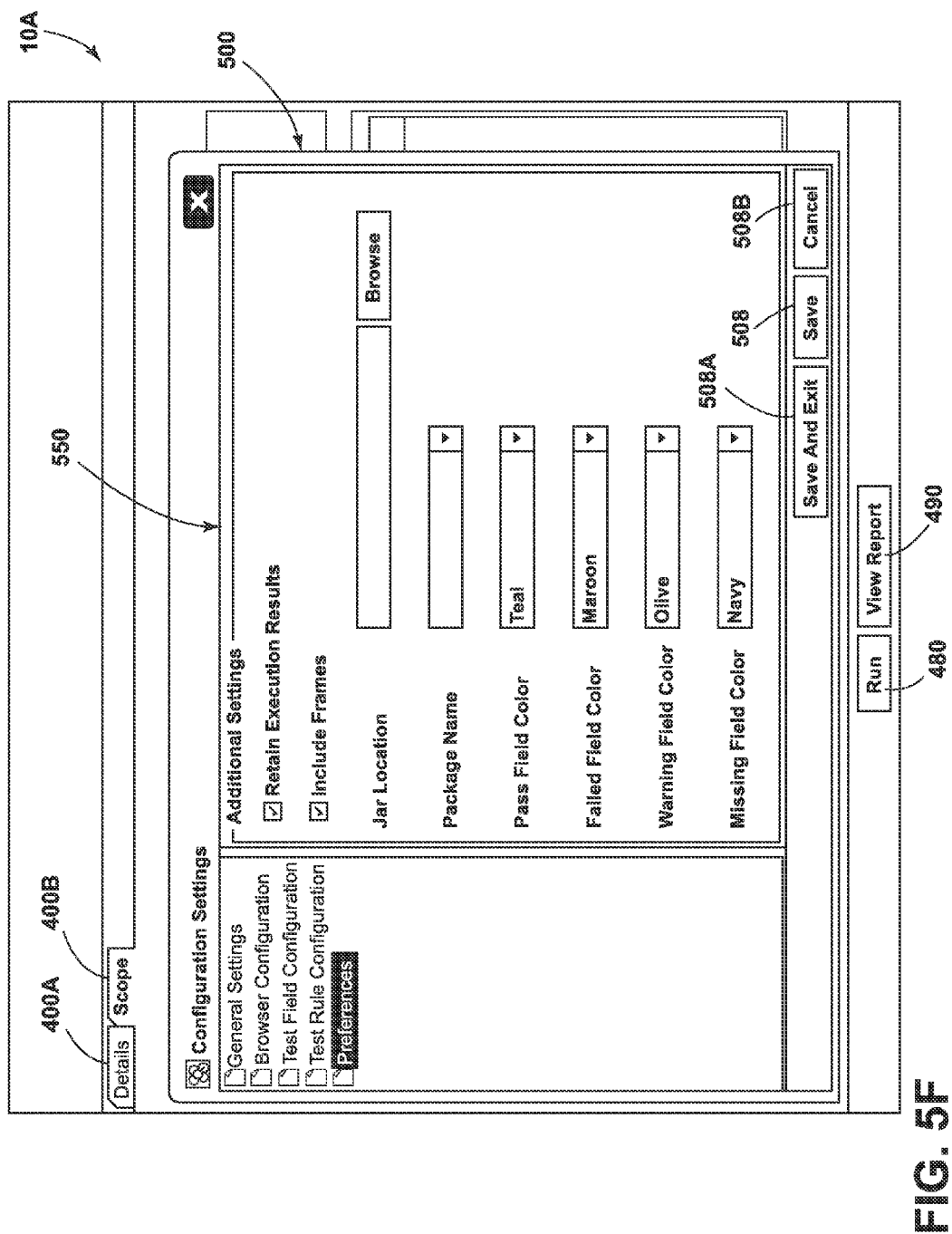

Referring now to FIGS. 5A-5F, interface 206 may include GUI 500. GUI 500 may include a configuration or "Config" tab/window 504 that may be selected for the purpose of configuring and/or customizing one or more of aspects (e.g., menus) of the GUI 400 (e.g., as generally illustrated in FIGS. 4A-4C). Customizing aspects of the GUI 400 may permit a user to more efficiently use the tool (e.g., commonly selected parameters may be easier to locate and select). In embodiments, GUI 500 may include a "Request" tab 502 that may be selected by the user to return (e.g., from the Config tab 504) to the GUI 400. In any case, selection of the "Config" tab 504 may produces a configuration GUI 500, such as generally illustrated by example in FIGS. 5A-5F. The GUI 500 may be displayed by the processor 14 on a display device/monitor 24 that may be included in the peripheral devices 22 of the computing device 12. The graphical interface 500 may include, for example, a graphic area 510 via which a user may specify a default URL which will then appear in the text box 412 as the default URL to be used for cross-browser web application testing. In embodiments, the user may modify the URL within the text box 412 from the default URL to a desired URL. In embodiments, the graphic area 510 may include text boxes, via which the user may specify one or more of a page load wait time, an implicit wait time, and a script wait time. In embodiments, GUI 500 may include an "EDIT" button 506 that upon user selection may allow for values displayed in GUI 500 to be edited (e.g., as generally illustrated in FIG. 5A). In embodiments, GUI 500 may include a "SAVE" button 508 and/or a "SAVE & EXIT" button 508A, that upon selection by the user may save any edits made by the user. Button 508A may allow the user to save any edits and exit the Config tab/window 504 (e.g. and return to GUI 400). In embodiments, GUI 500 may include a "CANCEL" button 508B that may, upon selection by the user, exit the Config tab/window 504 (e.g., and return to GUI 400) without saving any edits.

In embodiments, the GUI 500 may include a browser setting configuration area 520 via which a user may specify two or more browser instances which will then be displayed in the browser menu 420 (e.g., as generally illustrated in FIGS. 4A and 4B). A browser instance may include any particular version of a web browser supported by the cross-browser web application testing tool 10A, and/or which may be stored on the computing device 12, on any virtual machine operating on the computing device 12 or on any remote machine such as any one or more of the servers 34, any computing device $36_1$-$36_M$ coupled thereto, and/or any of the computing devices 38. In embodiments, the browser setting configuration area 520 may include one or more fields specifying the location and/or access instructions of the various web browsers specified. The browser setting configuration area 520 may include "Add" and "Remove" buttons 522, 524, respectively, that may permit a user to add and/or remove certain web browser instances to/from the list of web browsers in the browser setting configuration area 520, which may also cause changes to the browser instances displayed in the browser menu 420. For example, and without limitation, it may be desirable to limit the browser instance options presented in the browser menu 420 so that commonly used browser instances are easier to locate and/or select (e.g., it may be more efficient for a user to select desired browsers from a shorter list of browser instances). A user may be able to specify an IP address and/or port number of a hub, which may allow access to a remote web browser that may be available on a remote computer within a network.

In embodiments, the GUI 500 may include a test field configuration area 530 via which a user may specify in a test field list one or more web application test fields that are desired to be displayed in the test field menu 430 (e.g., as generally illustrated in FIGS. 4A and 4C). In embodiments, the test field list in the test field configuration area 530 may include fields specifying an identifier for each specified test field (e.g., XPATH, Class_Name, etc.) and a value associated with the specified test field (e.g., "//input" for Inputs, "//img" for Images, etc). The test field configuration area 530 may include "Add" and "Remove" buttons 532, 534, respectively, that may facilitate a user adding and/or removing web application test fields to/from the list of test fields in the test field configuration area 530. Modifying the test fields in the configuration area 530 may cause corresponding modifications to the test field menu 430. In embodiments, the test field configuration area 530 may be populated with any of the various web elements or fields of a specified URL that will be rendered by a web browser. Examples of such test fields may include, but are not limited to, Inputs, Images, Labels, Headers, Header3, Sub heading, and the like.

In embodiments, the GUI 500 may include a test field attribute configuration area 540 via which a user may specify in a test field attribute list one or more web application test field attributes that may then be displayed in the attribute menu 450 (e.g., as generally illustrated in FIGS. 4A and 4C). In embodiments, the test field attribute list in the test field attribute configuration area 540 may include fields specifying an attribute type (e.g., SIZE_HEIGHT, SIZE_WIDTH, ORDINATE_X, ORDINATE_Y, etc.) and an attribute identifier. In embodiments, the test field attribute list in the test field attribute configuration area 540 may include a field that may allow a user to specify a default maximum error tolerance value associated with each test field attribute. As with the example illustrated in FIGS. 4A and 4C, error tolerance values specified in configuration area 540 may range between 0 and 100, although other values and/or ranges are contemplated. The maximum error tolerance value may illustratively be disabled for any test field attribute by entering an error tolerance value disable code, (e.g., −1), in the maximum error tolerance test field for that test field attribute. The test field attribute configuration area 540 may include "Add" and "Remove" buttons 542, 544, respectively, that may facilitate a user adding and/or removing web application test field attributes to/from the list of test field attributes in the test field attribute configuration area 540. In embodiments, the test field attribute configuration area 540 may be populated with any testable attribute of any of the specified test fields. For example, the World Wide Web Consortium (W3C) has published a set of 95 standard recommended properties ("95 W3C") for setting style attributes for various web elements that influence web browser rendering, and the current 95 W3C list is set forth below in Table I.

TABLE I

| | 95 W3C Property |
|---|---|
| 1 | background-attachment |
| 2 | background-color |
| 3 | background-image |
| 4 | background-position |
| 5 | background-repeat |
| 6 | background |
| 7 | border-collapse |
| 8 | border-color |
| 9 | border-spacing |
| 10 | border-style |
| 11 | border-top |
| 12 | border-top-color |
| 13 | border-top-style |
| 14 | border-top-width |
| 15 | border-right |
| 16 | border-right-color |
| 17 | border-right-style |
| 18 | border-right-width |
| 19 | border-bottom |
| 20 | border-bottom-color |
| 21 | border-bottom-style |
| 22 | border-bottom-width |
| 23 | border-left |
| 24 | border-left-color |
| 25 | border-left-style |
| 26 | border-left-width |
| 27 | border-width |
| 28 | border |
| 29 | bottom |
| 30 | caption-side |
| 31 | clear |
| 32 | clip |
| 33 | color |
| 34 | content |
| 35 | counter-increment |
| 36 | counter-reset |
| 37 | cursor |
| 38 | direction |
| 39 | display |
| 40 | empty-cells |
| 41 | float |
| 42 | font-family |

TABLE I-continued

| | 95 W3C Property |
|---|---|
| 43 | font-size |
| 44 | font-style |
| 45 | font-variant |
| 46 | margin-left |
| 47 | margin-bottom |
| 48 | font-weight |
| 49 | font |
| 50 | height |
| 51 | left |
| 52 | letter-spacing |
| 53 | line-height |
| 54 | list-style-image |
| 55 | list-style-position |
| 56 | list-style-type |
| 57 | list-style |
| 58 | padding-right |
| 59 | padding-bottom |
| 60 | padding-left |
| 61 | margin-right |
| 62 | margin-top |
| 63 | margin |
| 64 | max-height |
| 65 | max-width |
| 66 | min-height |
| 67 | min-width |
| 68 | orphans |
| 69 | outline-color |
| 70 | outline-style |
| 71 | outline-width |
| 72 | outline |
| 73 | overflow |
| 74 | padding-top |
| 75 | padding |
| 76 | page-break-after |
| 77 | page-break-before |
| 78 | page-break-inside |
| 79 | position |
| 80 | quotes |
| 81 | right |
| 82 | table-layout |
| 83 | text-align |
| 84 | text-decoration |
| 85 | text-indent |
| 86 | text-transform |
| 87 | top |
| 88 | unicode-bidi |
| 89 | vertical-align |
| 90 | visibility |
| 91 | white-space |
| 92 | widows |
| 93 | width |
| 94 | word-spacing |
| 95 | z-index |

In addition to any of the foregoing 95 W3C properties, the user may specify in the test field attribute list in the test field attribute area 540 one or more other testable attributes. Examples of testable non-W3C properties include, but are not limited to, x-Axis, y-Axis, image source path, hyper link path, tool tip text, box shadow, opacity, marker-offset, and/or inner text. Some of the testable non-W3C properties may correspond to a particular browser (e.g., box shadow, opacity, and marker offset may correspond to Firefox™) and/or may not apply to all browsers. In embodiments, some of the testable properties may be visual properties and/or some of the testable properties may be nonvisual properties. In embodiments, tool may be configured to test non-visual properties/attributes for discrepancies and/or test visual properties for discrepancies.

In embodiments, the GUI 500 may include an "Additional Settings" area 550 via which a user may select addition testing settings. In embodiments, a user may be permitted to select a user intervention mode in which may allow a user to intervene in a cross-browser web application test during the test (e.g., prior to the completion of the test). In embodiments, a user may be permitted to (i) select whether to retain execution results, (ii) select whether to include frames, (iii) specify a jar location, (iv) select a package name, and/or (v) select colors for the pass field/flag, the failed field/flag, the warning field/flag, and/or the missing field/flag.

Figure 6A:
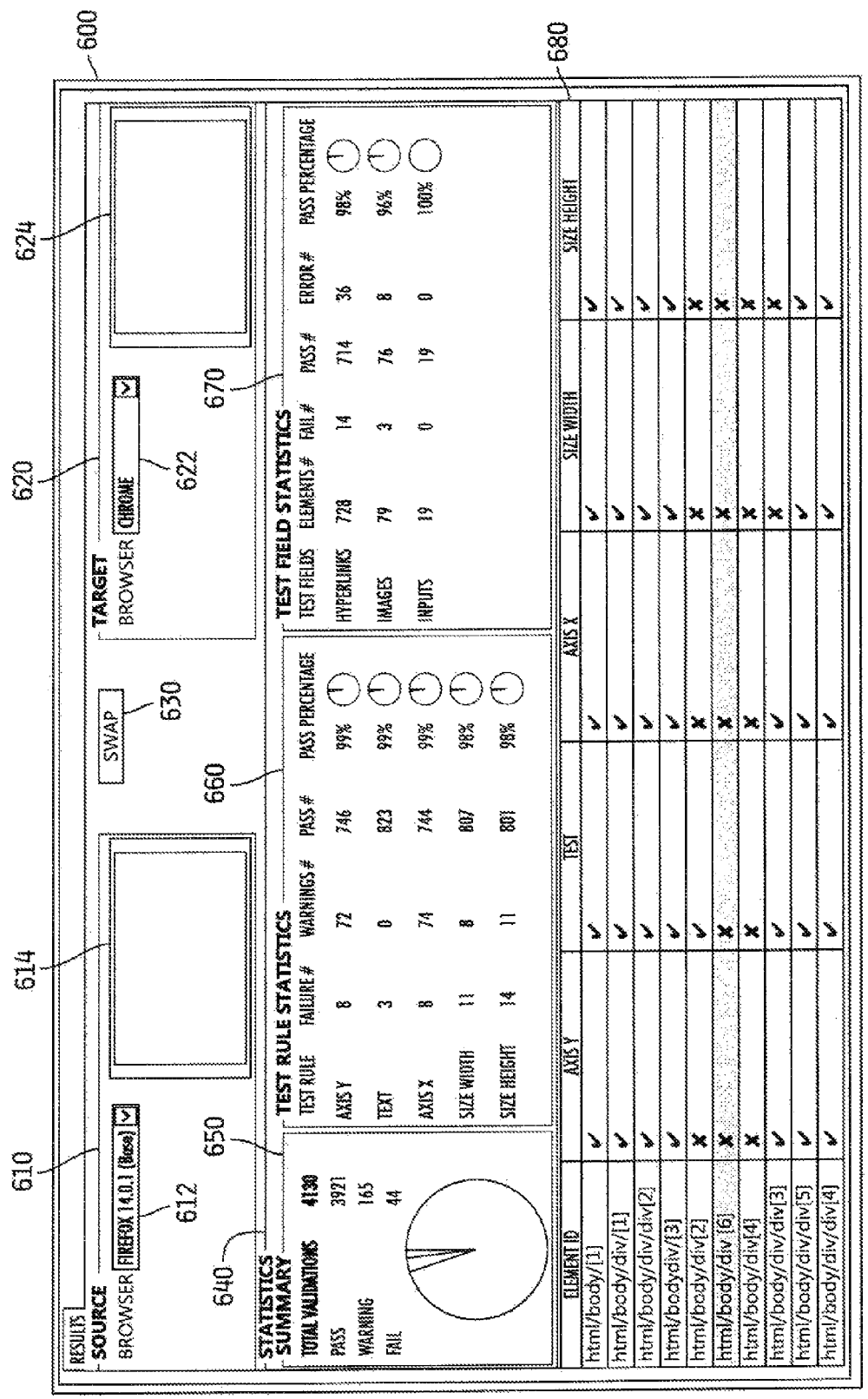
FIGS. 6A-6C are example screen shots illustrating an example testing result report generated by embodiments of the cross-browser web application testing tool.
Figure 6B:
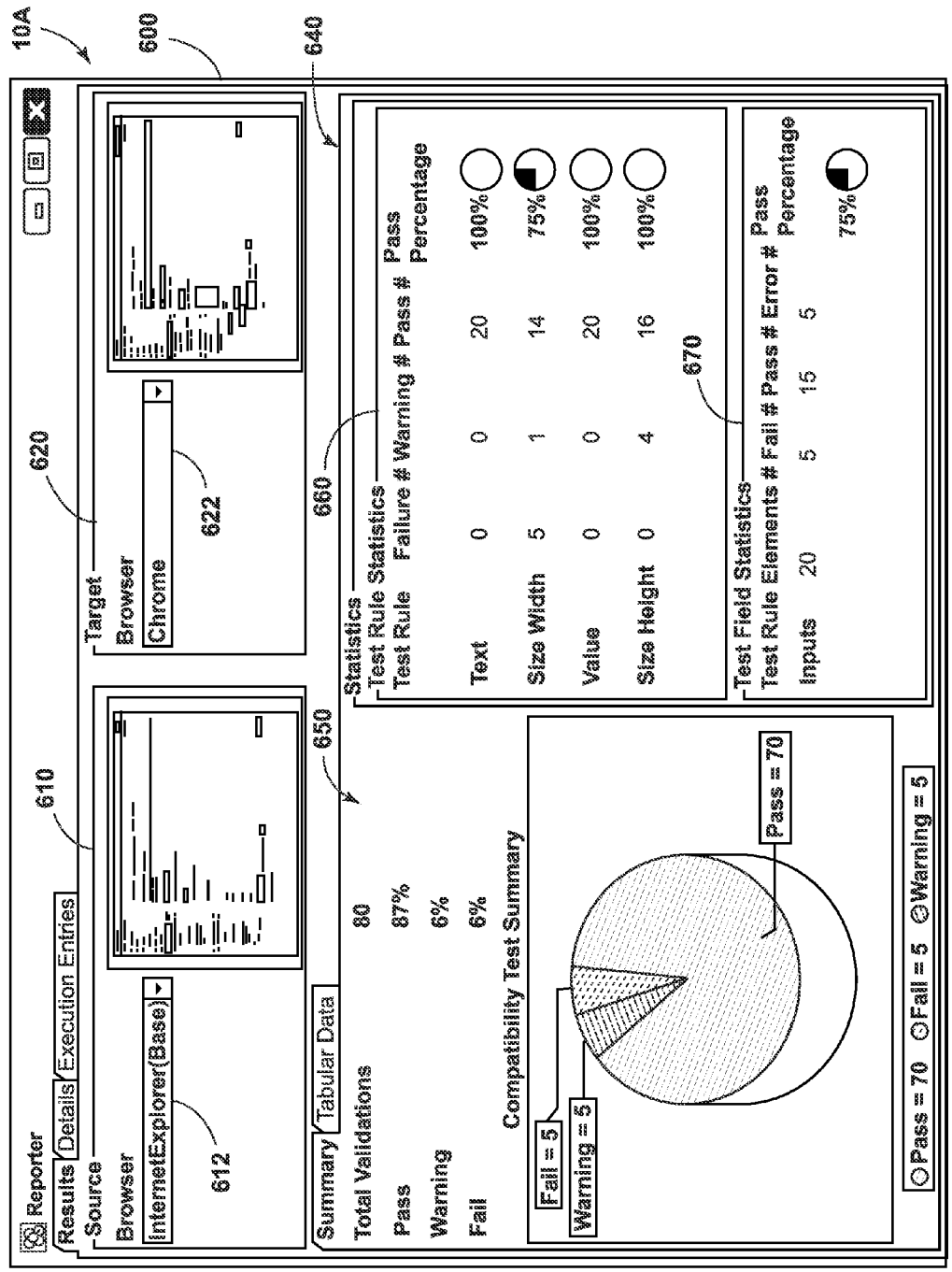
Figure 6C:
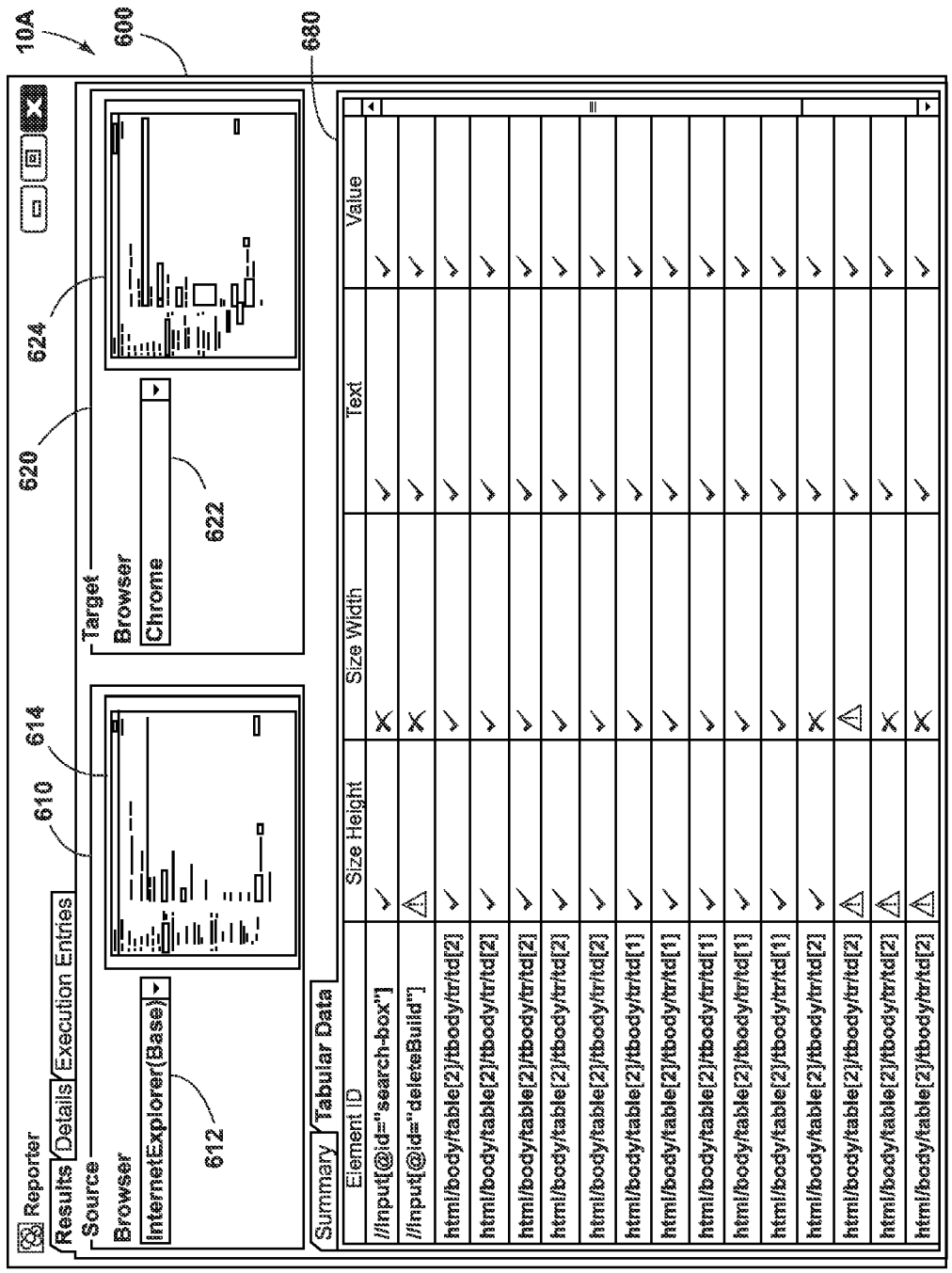

Referring now to FIGS. 6A-6C, selection of the "View Report" button 490 in the GUI 400 (e.g., as generally illustrated in FIGS. 4A-4C and 5B-5F) may produce the graphical user report interface 600, an embodiment of which is generally illustrated as an example in FIGS. 6A-6C. The GUI 600 is may be displayed by the processor 14 on a display device/monitor 24 that may be included in the peripheral devices 22 of the computing device 12. The GUI 600 may be displayed in a single screen (e.g., as generally illustrated in FIG. 6A) and/or may be displayed in a tabbed format (e.g., as generally illustrated in FIGS. 6B and 6C). The GUI 600 may include, for example only, browser selection areas 610, 620 via which a user may specify which reports for at least two of the browsers selected for testing (e.g., selected by the user via the test browser menu 420, as generally illustrated, for example only, in FIGS. 4A and 4B) should be displayed for comparison. For example only, the browser selection area 610 may include a pull-down menu 612 via which the user may specify a "source" browser from the browsers selected for testing, and the browser selection area 620 may include a pull-down menu 622 via which the user may specify a "target" browser from the browser selected for testing. In embodiments, the source browser may serve as the base browser against which the target browser is compared by the cross-browser web application testing tool 10A. The user may at any time specify any of the browsers selected for testing as the source browser and the target browser. The GUI 600 may include a "SWAP" button 630 which, upon user selection thereof, may cause the roles of the source and target browsers to switch (e.g., the browser selected as the source browser to becomes the target browser and vice versa). In embodiments, the report interface 600 further includes a graphic 614 of the selected URL as rendered by the source browser and a graphic 624 of the selected URL as rendered by the target browser. In embodiments, user selection of the source browser and the target browser may serve as the basis for the remainder of the graphical user report interface 600 in that the report(s) generated by the cross-browser web application testing tool 10A feature the source browser as the browser against which the target browser is compared.

In embodiments, the graphical user report interface 600 may include a statistics report area 640 and a detailed test field/attribute error report 680. In embodiments, the detailed error report 680 may be provided in the form of a table that may identify rows of test field (e.g., web element) values and columns of various test field attributes that may correspond to each of the test fields. In embodiments, as shown by example in FIGS. 6A and 6C, the cross-browser web application testing tool 10A is operable to generate an error flag (e.g., each "x" in the report 680) for each selected test field attribute of each selected test field of the web page rendered by the target web browser that differs from a corresponding attribute of a corresponding test field within the web page rendered by the source browser. If an error tolerance value has been applied to the attribute (e.g., via error tolerance fields 470 or attribute confirmation area), the tool may only generate an error flag if the difference between the source and target browsers is at least the error tolerance value associated with the selected test field attribute. Thus, if the difference between a selected test field attribute of a selected test field within the selected web page as rendered by the source web browser and the same test field attribute of the same test field of the same web page as rendered by the target web browser is greater than or equal to the error tolerance value specified for the selected test field attribute of the selected test field, the cross-browser web application testing tool 10A may generate an error flag for the selected test field attribute of the selected test field. The test field/attribute error report 680 illustratively identifies such error flags along with their associated test fields and test field attributes.

Alternatively or additionally, as also shown by example in FIGS. 6A and 6C, the cross-browser web application testing tool 10A may be operable to generate a pass flag (e.g., each check mark in the report 680) for each selected test field attribute of each selected test field of the web page rendered by the target web browser that equals a corresponding attribute of a corresponding test field within the web page rendered by the source browser. Thus, if there is no difference between a selected test field attribute of a selected test field within the selected web page as rendered by the source web browser and the same test field attribute of the same test field of the same web page as rendered by the target web browser, the cross-browser web application testing tool 10A generates a pass flag for the selected test field attribute of the selected test field. In embodiments in which the cross-browser web application testing tool 10A generates such pass flags, the test field/attribute error report 680 illustratively identifies the pass flags along with their associated test fields and test field attributes.

In embodiments, as illustrated in FIGS. 6A and 6C, the cross-browser web application testing tool 10A may be operable to generate a warning flag (e.g., each triangular symbol with an exclamation point therein, as generally illustrated in the report 680). The warning flag may be generated for each selected test field attribute of each selected test field of the web page rendered by the target web browser that is not the same as a corresponding attribute of a corresponding test field within the web page rendered by the source browser, but differs by less than the error tolerance value associated with the selected test field attribute.

In embodiments, a statistics report area 640 of the graphical user report interface 600 may include one or more of a summary report 650, a test rule statistics report 660, and a test field statistics report 670. As generally illustrated in FIGS. 6A and 6B, a statistics report area 640 may include all three of these reports 650, 660, 670. The summary report 650 may provide a graphic identifying a total number of pass flags and error flags over all comparisons made by the web application test module. Thus, the report graphic 650 illustrated in FIGS. 6A and 6B shows total validations (e.g., total test field/attribute tests conducted), and, of the total validations, the total number of pass flags and the total number of error (e.g., fail) flags.

In embodiments, the test rule statistics report 660 may show one or more of pass, fail, warnings, and total pass percentages by test field attribute for one or more test field attributes. For example, and without limitation, the test rule statistics report 660 (e.g., as generally illustrated in FIGS. 6A and 6B) may shows pass, fail, warnings and total pass percentages for each of the test field attributes Axis Y, Text, Axis X, Size Width and Size Height.

In embodiments, the test field statistics report 670 may show one or more of pass, fail, warnings and total pass percentages by test field for one or more test fields. For example, and without limitation, the test field statistics report 670 (e.g., as generally illustrated in FIGS. 6A and 6B) may show pass, fail, warnings and total pass percentages for each of the test fields Hyperlinks, Images, and Inputs.

Referring again to the browser selection areas 610, 612, the cross-browser web application testing tool 10A may generate, in embodiments, an image of the selected URL rendered by the source browser in the graphic area 614, and a difference image in the graphic area 624. The difference image may include a rendering of the selected URL by the target web browser in which test fields having at least one error flag are identified (e.g., by a first type of highlighting). Alternatively or additionally, the difference image may include test fields that having no error flags and may also be identified (e.g., by a second type of highlighting that is different from the highlight used to identify the test fields having at least one error flag). In embodiments, selection of the graphic 624 illustratively may cause the tool 10A to produce the graphic 750 of the difference image as illustrated by example in FIG. 7B.

Figure 7A:
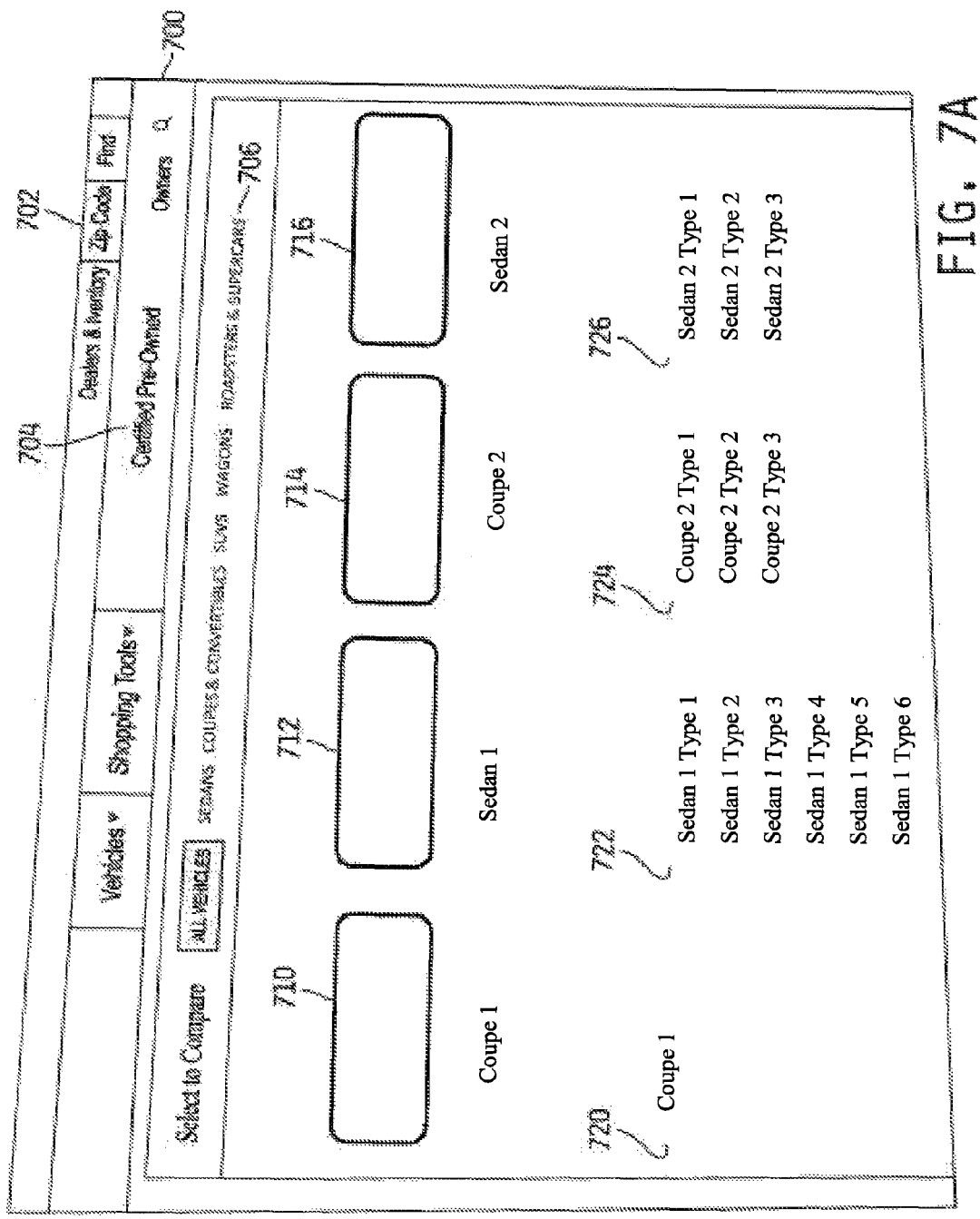
FIG. 7A is an example screen shot illustrating an example web page tested by embodiments of the cross-browser web application testing tool.
Figure 7B:
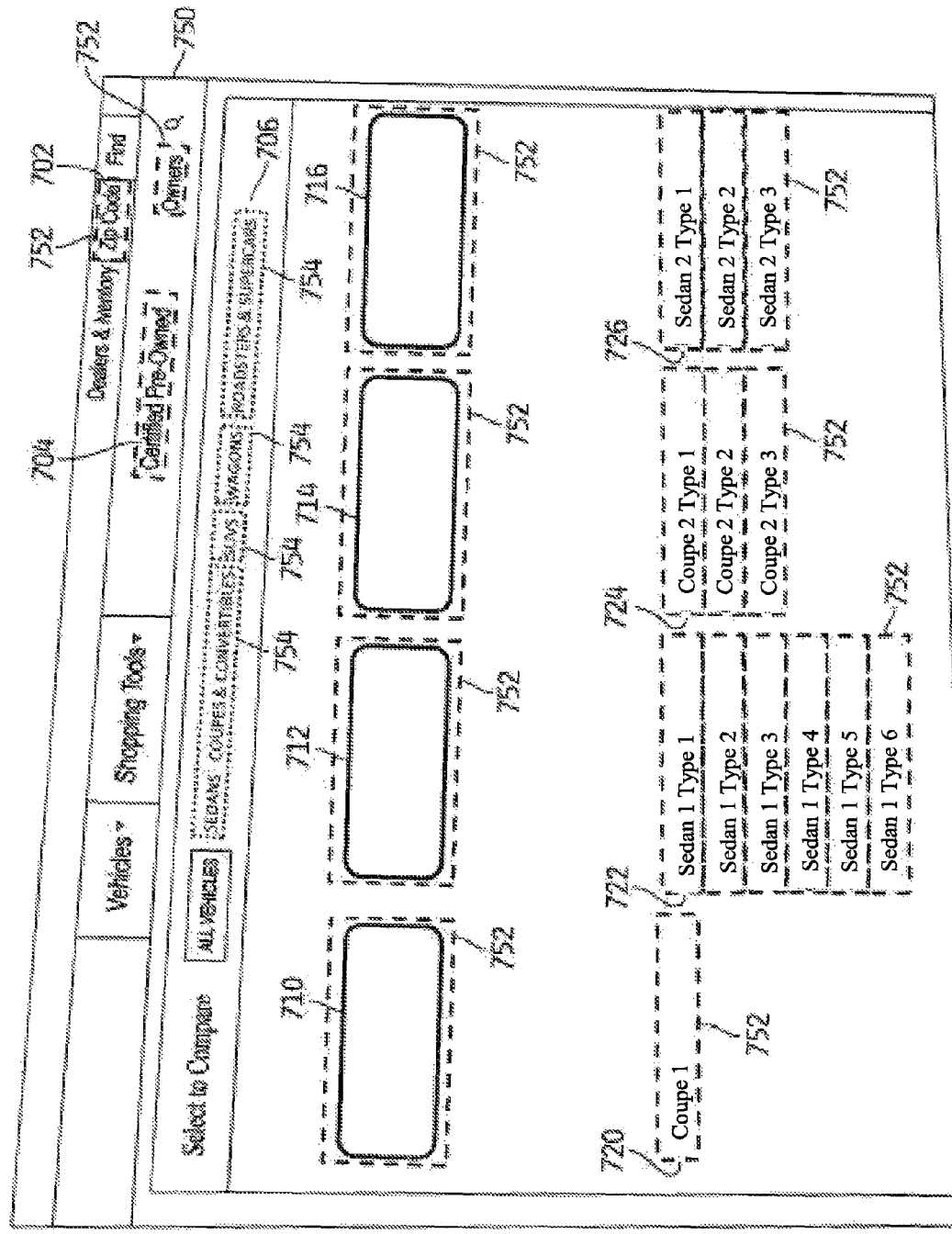
FIG. 7B is an example screen shot illustrating the example web page of FIG. 7A with highlighting superimposed thereon by embodiments of the cross-browser web application testing tool to illustrate comparative renderings between two different web browsers.

Referring to FIG. 7A, a graphic 700 is shown of the selected URL as rendered by the source browser (or by the target browser). In the illustrated example, the selected URL (e.g., web page) includes a zip code 702 in a top, right corner of the URL, a vehicle status area 704 just below the zip code 702, a vehicle type area 706 just below the vehicle status area 704, images 710, 712, 714, 716 of a number of different vehicles available, and text descriptions 720, 722, 724, 726 of the different models available for each of the number of different vehicles. Referring now to FIG. 7B, the difference image is shown in which the long-dash blocks 752 correspond to test fields in which no error flags are present, and the short-dash blocks 754 correspond to test fields in which at least one error flag is present. Thus, in the illustrated example, the long-dash blocks 752 serve to highlight error-free test fields, and the short-dash blocks serve to highlight test fields having at least one error flag. This graphic feature may provide a ready visual identifier of areas of the selected URL in which the differences in renderings produced by the two different web browsers are within the specified error tolerance values and in which the differences are outside of the specified error tolerance values.

Figure 8:
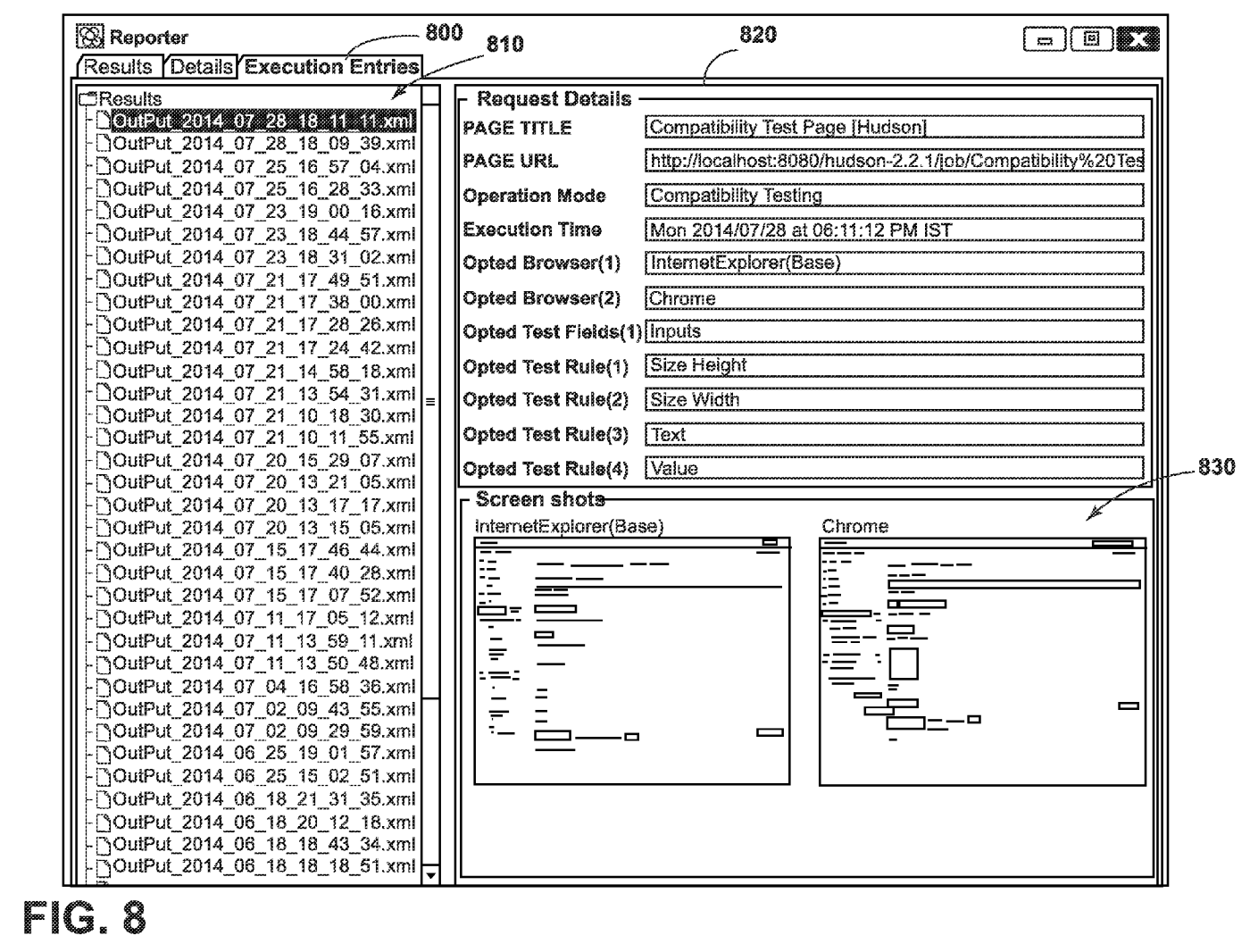

In embodiments, as generally illustrated in FIG. 8, the cross-browser web application testing tool 10A may be configured to generate an execution entries/test history GUI 800. GUI 800 may permit a user to select results files 810 from previously run tests, view details 820 about the selected previously run test, and/or view screenshots 830 from the selected previously run test.

In embodiments, the cross-browser web application testing tool 10A may be operable to compare text fields, such as labels, against each other for content rather than to a predefined language standard (e.g., character by character). Comparing text fields for content may allow for comparisons to be independent of the human language (e.g., English, French, Spanish, etc.) in which the text fields may be rendered by the source and target web browsers. Additionally or alternatively, the tool may further include or make use of a language translation module 336. The language translation module 336 may be configured to analyze a text field that is initially determined to be inconsistent with a base test field. The translation module 336 may automatically (e.g., without further user intervention) progressively translate the inconsistent text fields (e.g., by cycling translations of the inconsistent field according to one or more alternative languages) and compare each translated version of the inconsistent test field with the base test field. If a match is found (e.g., the inconsistent test field is actually just the base test field in a different human language), the tool may not return an error or warning. If a match is not found, the tool may generate an error flag. In embodiments, the translation module 336 may permit accurate comparisons of text fields in at least two different human languages. The translations module 336 may reverse engineer textual labels and tools.

It should now be apparent that a cross-browser web application testing tool 10A may be operable to manage cross-browser testing in an automated and secure manner since the source code of the tool, the user interfaces and the test data of the application under test are not exposed to the outside world. Moreover, the tool may be operated without any knowledge of scripting as all interfaces may be script-less.

The tool 10A may operate at a root level of distortion by parsing all selected test field attributes of all selected test fields within a selected URL for validation across multiple browser instances. In embodiments, distortion may be visual and/or non-visual, and operating at a root level (e.g., as opposed to a pixel-by-pixel level) may allow for the tool to identify such non-visual distortions. In embodiments, operating at a root level may include the tool 10A testing a selected web page or application independently of what a selected browser actually displays to a user. Operating a root level may be advantageous relative to operating at a pixel-by-pixel level because of pixel differences may be caused by different operating systems, different viewing resolutions, and/or browser-specific nuances, and those pixel differences may not actually result in perceptible distortions, but may still result in error messages. Operating at a root level may allow the tool to evaluate a web application independent of operating system, resolution, and/or browser-specific nuances. Moreover, the cross-browser web application testing tool 10A may conduct such validations with a user-controlled margin of error and generate multiple, detailed reports in one or more graphic user interface formats. In embodiments, the tool may provide for highlighting of test fields to identify those containing one or more error flags and/or those containing no error flags. Thus, because all cross-browser distortions may be identified by the tool and displayed in a graphic user interface format, manual image comparison may be avoided.

The tool may incorporate one or more of a myriad of features, examples of which include, but are not limited to, support for multiple (two or more) web browsers and various versions thereof, remote browser access, screen shot capture, web page content validation, element run time properties validation (in excess of the 95 W3C Standard properties), controlled margins of rendering comparison error (with user threshold setting capability), secure web application testing, detailed reporting, automated validation and script-less automation, any or all of which may be accomplished without any manual test validation.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A computer-implemented method for cross-browser testing of one or more web applications, the method comprising:
receiving, with at least one of the one or more computers, user selection of two or more web browsers,
receiving, with at least one of the one or more computers, user selection of one or more test fields each corresponding to a specified web element within a web page,
receiving, with at least one of the one or more computers, user selection of one or more attributes each corresponding to a specified property of a web element within a web page,
receiving, with at least one of the one or more computers, user selection of a tolerance value for each of the one or more selected attributes, each tolerance value corresponding to an allowed rendering error of a corresponding one of the one or more attributes,
accessing, with at least one of the one or more computers, the web page,
comparing, with at least one of the one or more computers, each selected attribute of each selected test field within the web page rendered by one of the two selected browsers with a corresponding attribute of a corresponding test field within the web page rendered by the other of the two selected browsers as a function of the selected tolerance value associated with each selected attribute, and with at least one of the one or more computers, generating a report of the comparisons;
wherein a graphical user interface (GUI) module on at least one of the one or more computers is configured to receive user selection of at least two of the two or more web browsers, user selection of one or more test fields each corresponding to a specified web element within a web page, and a user selection of a plurality of attributes each corresponding to a specified property of a web element within a web page, wherein the GUI module is configured to display the selected one or more attributes to the user and receive a user selection of a tolerance value for each of the one or more selected attributes, each tolerance value corresponding to an allowed rendering error of a corresponding one of the one or more attributes,
wherein a web application test module on the at least one of the one or more computers is configured to access a web page via the public or private network, the web application module configured to compare each selected attribute of each selected test field within the web page rendered by one of the at least two selected browsers with a corresponding attribute of a corresponding test field within the web page rendered by the another of the at least two selected browsers as a function of the selected tolerance value associated with each selected attribute,
wherein the web application test module is configured to compare run time values to detect distortion, the run time values derived from a document object model of the web page, the document object model including at least a predefined human language, of each selected attribute of each selected test field within the web page rendered by one of the at least two selected browsers with a run time value of a corresponding attribute of a corresponding test field within the web page rendered by the another of the at least two selected browsers as a function of the selected tolerance value associated with each selected attribute; and
wherein a report module on the at least one of the one or more computers is configured to generate a report of the comparisons.

2. The computer-implemented method of claim 1, further comprising generating, with at least one of the one or more computers, at least one of an error flag for each selected attribute of each selected test field of the web page rendered by the one of the two selected browsers that differs from a corresponding attribute of a corresponding test field within the web page rendered by the other of the two selected browsers by at least the tolerance value associated with the selected attribute and a pass flag for each selected attribute of each selected test field of the web page rendered by the one of the two selected browsers that differs from a corresponding attribute of a corresponding test field within the web page rendered by the other of the two selected browsers by less than the tolerance value associated with the selected attribute.

3. The computer-implemented method of claim 2, wherein accessing the web page comprises the selected browsers receiving information from a web server, and the selected browsers transforming the information received from the webserver to render the web page to the user, wherein the each of the selected browsers transforms the information received from the webserver differently.

4. The computer-implemented method of claim 1, wherein comparing comprises comparing a run time value of each selected attribute of each selected test field within the web page rendered by the one of the two selected browsers with a run time value of a corresponding attribute of a corresponding test field within the web page rendered by the other of the two selected browsers as a function of the selected tolerance value associated with each selected attribute.

5. The computer-implemented method of claim 1, wherein at least one of the one or more selected test fields is a text field, and wherein comparison of the text field rendered by the one of the two selected browsers with the text field rendered by the other of the two selected browsers is independent of at least a predefined human language in which the text field is rendered by the two selected browsers.

6. A cross-browser web application testing system comprising:
a memory unit having two or more different web browsers stored therein,
one or more computers coupled to the memory unit and connectable to a public or private network,
a graphical user interface (GUI) module on at least one of the one or more computers configured to receive user selection of at least two of the two or more web browsers, user selection of one or more test fields each corresponding to a specified web element within a web page, and a user selection of a plurality of attributes each corresponding to a specified property of a web element within a web page, wherein the GUI module is configured to display the selected one or more attributes to the user and receive a user selection of a tolerance value for each of the one or more selected attributes, each tolerance value corresponding to an allowed rendering error of a corresponding one of the one or more attributes,
a web application test module on the at least one of the one or more computers configured to access a web page via the public or private network, the web application module configured to compare each selected attribute of each selected test field within the web page rendered by one of the at least two selected browsers with a corresponding attribute of a corresponding test field within the web page rendered by the another of the at least two selected browsers as a function of the selected tolerance value associated with each selected attribute,
wherein the web application test module is configured to compare run time values to detect distortion, the run time values derived from a document object model of the web page, the document object model including at least a predefined human language, of each selected attribute of each selected test field within the web page rendered by one of the at least two selected browsers with a run time value of a corresponding attribute of a corresponding test field within the web page rendered by the another of the at least two selected browsers as a function of the selected tolerance value associated with each selected attribute; and
a report module on the at least one of the one or more computers configured to generate a report of the comparisons.

7. The system of claim 6, wherein the web application test module is configured to generate an error flag for each selected attribute of each selected test field of the web page rendered by the one of the at least two selected browsers that differs from a corresponding attribute of a corresponding test field within the web page rendered by the another of the at least two selected browsers by at least the tolerance value associated with the selected attribute.

8. The system of claim 7, wherein the report module is configured to generate a report identifying the error flags along with the attributes and the test fields associated therewith.

9. The system of claim 7, wherein the web application test module is configured to generate a pass flag for each selected attribute of each selected test field of the web page rendered by the one of the at least two selected browsers that equals a corresponding attribute of a corresponding test field by an amount within the web page rendered by the another of the at least two selected browsers.

10. The system of claim 9, wherein the web application test module is configured to generate a warning for each selected attribute of each selected test field of the web page rendered by the one of the at least two selected browsers that differs from a corresponding attribute of a corresponding test field by a non-zero amount that is within the tolerance value associated with the selected attribute, and wherein the report module is configured to generate a report identifying the error flags along with the attributes and the test fields associated therewith, further identifying the pass flags along with the attributes and the test fields associated therewith, and further identifying a number of warnings generated.

11. The system of claim 9, wherein the report module is configured to generate a report identifying a total number of pass flags and error flags over all comparisons made by the web application test module.

12. The system of claim 6, wherein at least one of the one or more attributes selected by the user are non-visual attributes.

13. The system of claim 9, wherein the report module is configured to generate a report identifying a total pass flag percentage for at least one of the selected attributes across all of the selected test fields.

14. The system of claim 6, wherein the user interface module to produce a graphic user interface including a first menu of the two or more web browsers for user selection therefrom, a second menu of the one or more test fields for user selection therefrom, a third menu of the one or more attributes for user selection therefrom and one or more tolerance value fields for user selection of the tolerance value for each of the one or more selected attributes.

15. The system of claim 14, further comprising a data management module to receive user selection of items contained in at least one of the first, second and third menus.

16. The system of claim 6, wherein the web application module is configured to compare each selected attribute of each selected test field for distortion independent of at least the predefined human language in which the text field is rendered by the two selected browsers.

17. A cross-browser web application testing system comprising:
a public or private network,
one or more processors, and
a memory having stored therein two or more different web browsers, the memory further having instructions stored therein which, when executed by at least one of the one or more processors, cause the at least one of the one or more processors to receive user input of a universal resource locator (URL), to receive user selection of two of the two or more web browsers, to receive user selection of one or more test fields each corresponding to a specified web element within a web page, to receive user selection of one or more attributes each corresponding to a specified property of a web element within a web page, to receive user selection of a tolerance value for each of the one or more selected attributes, each tolerance value corresponding to an allowed rendering error of a corresponding one of the one or more attributes, to access a web page specified by the URL via the public or private network, to compare each selected attribute of each selected test field within the web page rendered by one of the two selected browsers with a corresponding attribute of a corresponding test field within the web page rendered by the other of the two selected browsers as a function of the selected tolerance value associated with each selected attribute, and to generate a report of the comparisons;
wherein a graphical user interface (GUI) module on at least one of the one or more computers is configured to receive user selection of at least two of the two or more web browsers, user selection of one or more test fields each corresponding to a specified web element within a web page, and a user selection of a plurality of attributes each corresponding to a specified property of a web element within a web page, wherein the GUI module is configured to display the selected one or more attributes to the user and receive a user selection of a tolerance value for each of the one or more selected attributes, each tolerance value corresponding to an allowed rendering error of a corresponding one of the one or more attributes,
wherein a web application test module on the at least one of the one or more computers is configured to access a web page via the public or private network, the web application module configured to compare each selected attribute of each selected test field within the web page rendered by one of the at least two selected browsers with a corresponding attribute of a corresponding test field within the web page rendered by the another of the at least two selected browsers as a function of the selected tolerance value associated with each selected attribute,
wherein the web application test module is configured to compare run time values to detect distortion, the run time values derived from a document object model of the web page, the document object model including at least a predefined human language, of each selected attribute of each selected test field within the web page rendered by one of the at least two selected browsers with a run time value of a corresponding attribute of a corresponding test field within the web page rendered by the another of the at least two selected browsers as a function of the selected tolerance value associated with each selected attribute; and
wherein a report module on the at least one of the one or more computers is configured to generate a report of the comparisons.

18. The system of claim 17, wherein the instructions stored in the memory further include instructions which, when executed by at least one of the one or more processors, cause the at least one of the one or more processors to receive user selection of either of the two selected web browsers as a base web browser, and to be responsive to user selection of the standard web browser to generate the report of the comparisons of each selected attribute of each selected test field within the web page rendered by the non-selected one of the two selected browsers against a corresponding attribute of a corresponding test field within the web page rendered by the base web browser as a function of the selected tolerance value associated with each selected attribute, wherein each selected test field is a text field and wherein the comparisons are at least independent of a human language.

19. The system of claim 17, wherein the instructions stored in the memory further include instructions which, when executed by at least one of the one or more processors, cause the at least one of the one or more processors to generate an error flag for each selected attribute of each selected test field of the web page rendered by the one of the two selected browsers that differs from a corresponding attribute of a corresponding test field within the web page rendered by the other of the two selected browsers by at least the tolerance value associated with the selected attribute, and to generate a difference image of the web page rendered by the two selected web browsers, the difference image including a rendering of the web page with each of the selected test fields highlighted in which at least one error flag is present.

20. The system of claim 17, wherein the instructions stored in the memory further include instructions which, when executed by at least one of the one or more processors, cause the at least one of the one or more processors to generate a pass flag for each selected attribute of each selected test field of the web page rendered by the one of the two selected browsers that differs from a corresponding attribute of a corresponding test field within the web page rendered by the other of the two selected browsers by less than the tolerance value associated with the selected attribute, and to generate a difference image of the web page rendered by the two selected web browsers, the difference image including a rendering of the web page with each of the selected test fields highlighted in which no error flags are present.

* * * * *